US011536671B2

(12) United States Patent
Beckett et al.

(10) Patent No.: US 11,536,671 B2
(45) Date of Patent: Dec. 27, 2022

(54) DEFECT IDENTIFICATION USING MACHINE LEARNING IN AN ADDITIVE MANUFACTURING SYSTEM

(71) Applicant: Sigma Labs, Inc., Santa Fe, NM (US)

(72) Inventors: Darren Beckett, Corrales, NM (US); Roger Frye, Santa Fe, NM (US); Christina Xuan Yu, Albuquerque, NM (US); Scott Betts, Albuquerque, NM (US); Lars Jacquemetton, Santa Fe, NM (US); Kevin C. Anderson, Albuquerque, NM (US)

(73) Assignee: SIGMA LABS, INC., Santa Fe, NM (US)

( * ) Notice: Subject to any disclaimer, the term of this patent is extended or adjusted under 35 U.S.C. 154(b) by 0 days.

(21) Appl. No.: 17/390,034

(22) Filed: Jul. 30, 2021

(65) Prior Publication Data

US 2022/0042924 A1   Feb. 10, 2022

Related U.S. Application Data

(66) Substitute for application No. 63/062,949, filed on Aug. 7, 2020.

(51) Int. Cl.
*G01N 21/95* (2006.01)
*B29C 64/393* (2017.01)
(Continued)

(52) U.S. Cl.
CPC ........... *G01N 21/95* (2013.01); *B22F 10/366* (2021.01); *B22F 10/85* (2021.01); *B29C 64/135* (2017.08);
(Continued)

(58) Field of Classification Search
CPC ............... G01N 21/95; G01N 21/8806; G01N 2021/8845; B22F 10/366; B22F 10/85;
(Continued)

(56) References Cited

U.S. PATENT DOCUMENTS 10,189,204 B2 * 1/2019 Fulop .................. C09D 7/61
10,520,372 B2 * 12/2019 Dave .................. B22F 10/20
(Continued)

FOREIGN PATENT DOCUMENTS

| EP | 3459715 A1 | 3/2019 |
| EP | 3667565 A1 | 8/2020 |
| WO | 2020102757 A1 | 5/2020 |

OTHER PUBLICATIONS

PCT/US2021/044167, "International Search Report and Written Opinion", dated Nov. 18, 2021, 12 pages.

*Primary Examiner* — Sang H Nguyen
(74) *Attorney, Agent, or Firm* — Kilpatrick Townsend & Stockton LLP

(57) ABSTRACT

An additive manufacturing system comprises an apparatus arranged to distribute layer of metallic powder across a build plane and a power source arranged to emit a beam of energy at the build plane and fuse the metallic powder into a portion of a part. The system includes a processor configured to steer the beam of energy across the build plane and receive data generated by one or more sensors that detect electromagnetic energy emitted from the build plane when the beam of energy fuses the metallic powder. The received data is converted into one or more parameters that indicate one or more conditions at the build plane while the beam of energy fuses the metallic powder. The one or more parameters are used as input into a machine learning algorithm to detect one or more defects in the fused metallic powder.

11 Claims, 29 Drawing Sheets

(51) Int. Cl.
  *B33Y 10/00* (2015.01)
  *B33Y 50/02* (2015.01)
  *B22F 10/366* (2021.01)
  *G01N 21/88* (2006.01)
  *B29C 64/153* (2017.01)
  *B22F 10/85* (2021.01)
  *G05B 19/4099* (2006.01)
  *G06N 20/00* (2019.01)
  *B29C 64/135* (2017.01)

(52) U.S. Cl.
  CPC .......... *B29C 64/153* (2017.08); *B29C 64/393* (2017.08); *B33Y 10/00* (2014.12); *B33Y 50/02* (2014.12); *G01N 21/8806* (2013.01); *G05B 19/4099* (2013.01); *G06N 20/00* (2019.01); *G01N 2021/8845* (2013.01); *G05B 2219/32217* (2013.01)

(58) Field of Classification Search
  CPC ..... B29C 64/135; B29C 64/393; B33Y 10/00; B33Y 50/02; G05B 19/4099; G05B 2219/32217; G06N 20/00
  See application file for complete search history.

(56) References Cited

U.S. PATENT DOCUMENTS

| | | | |
|---|---|---|---|
| 10,688,560 B1* | 6/2020 | Gradl | B23K 15/0013 |
| 10,786,850 B2* | 9/2020 | Madigan | B23K 26/0626 |
| 11,072,043 B2* | 7/2021 | Dave | G01K 11/00 |
| 2016/0098825 A1* | 4/2016 | Dave | G06K 9/46 |
| | | | 419/53 |
| 2017/0090462 A1* | 3/2017 | Dave | G01N 21/71 |
| 2017/0326867 A1* | 11/2017 | Hartke | B29C 66/0242 |
| 2018/0126670 A1* | 5/2018 | DehghanNiri | B33Y 30/00 |
| 2018/0297113 A1* | 10/2018 | Preston | B33Y 50/02 |
| 2018/0304365 A1* | 10/2018 | Brzezinski | B22F 10/10 |
| 2018/0341248 A1* | 11/2018 | Mehr | G06N 3/08 |
| 2019/0039318 A1* | 2/2019 | Madigan | B23K 15/02 |
| 2019/0255654 A1* | 8/2019 | Beckett | B23K 26/032 |
| 2020/0096970 A1 | 3/2020 | Mehr et al. | |

* cited by examiner

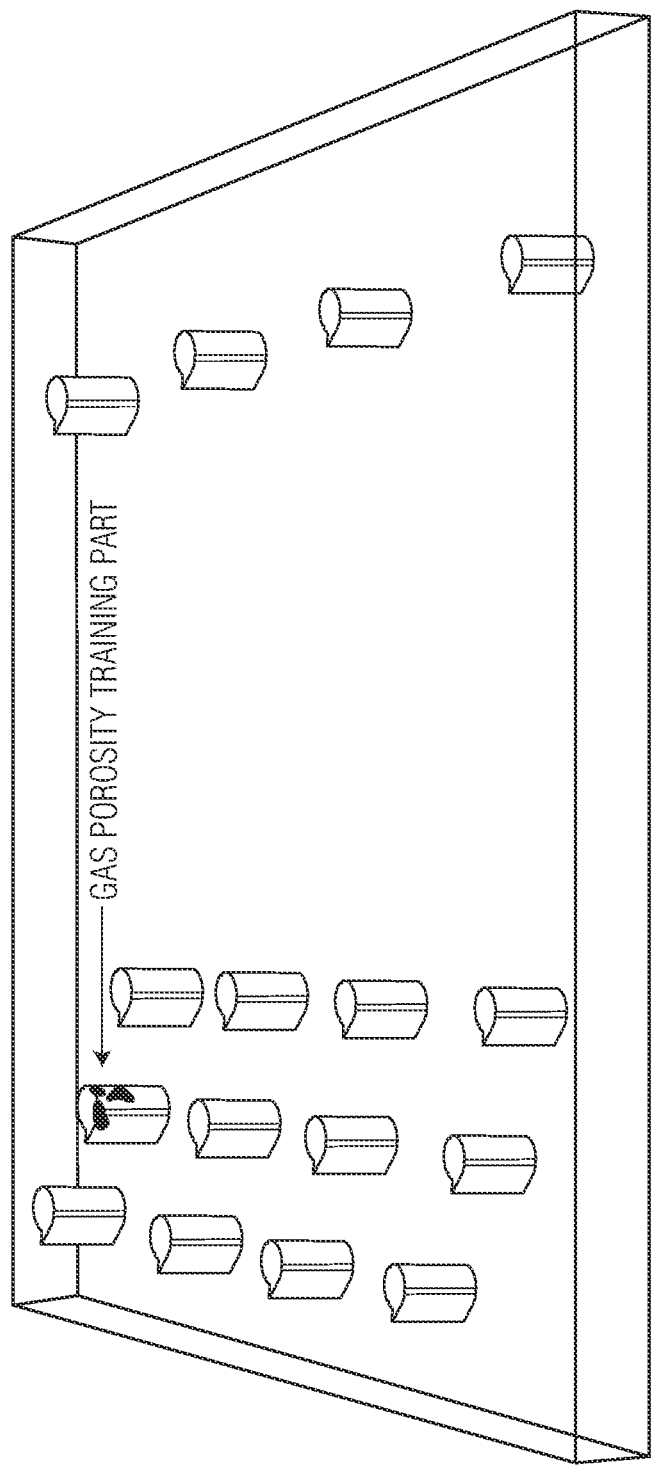

ial, layer by layer using one or more high power energy sources such as a laser or electron beam. The generation of defects in the finished part can be caused by multiple sources and such defects can be difficult to track and/or to detect. The defects can result in degradation of material properties of the finished part leading to premature failure. New methods to detect and characterize defects in parts that are made using additive manufacturing systems are needed.

DEFECT IDENTIFICATION USING MACHINE LEARNING IN AN ADDITIVE MANUFACTURING SYSTEM

CROSS-REFERENCES TO OTHER APPLICATIONS

This application claims priority to U.S. provisional patent application Ser. No. 63/062,949, for "DEFECT IDENTIFICATION USING MACHINE LEARNING IN AN ADDITIVE MANUFACTURING SYSTEM" filed on Aug. 7, 2020 which is hereby incorporated by reference in entirety for all purposes.

BACKGROUND OF THE INVENTION

Additive manufacturing, or the sequential assembly or construction of a part through the combination of material addition and applied energy, takes on many forms and currently exists in numerous implementations and embodiments. Additive manufacturing can be carried out by using any of a number of various processes that involve the formation of a 3-D part of any shape. The various processes that are used for making metallic parts have in common the sintering and/or melting of powdered or granular raw mater-

SUMMARY

Some embodiments of the present disclosure relate to additive manufacturing systems that employ machine learning to detect and identify different types of in-process defects that occur during the manufacturing process. Some embodiments relate to methods of training a machine learning algorithm with known defective parts. Other embodiments relate to methods of training the machine learning algorithm to distinguish one type of defect from another.

In some embodiments an additive manufacturing system comprises an apparatus arranged to distribute layer of metallic powder across a build plane. A power source is arranged to emit a beam of energy at the build plane and fuse the metallic powder into a portion of a part. A processor is configured to steer the beam of energy across the build plane and to receive data generated by one or more sensors that detect electromagnetic energy emitted from the build plane when the beam of energy fuses the metallic powder. The processor converts the received data into one or more parameters that indicate one or more conditions at the build plane while the beam of energy fuses the metallic powder and uses the one or more parameters as input into a machine learning algorithm to detect one or more defects in the fused metallic powder.

In some embodiments the machine learning algorithm is further configured to determine a type of the one or more defects. In various embodiments the type of the one or more defects includes a lack of fusion defect, a porosity defect or an inclusion defect. In some embodiments the one or more parameters includes determining a thermal emission density (TED) that includes measuring an amount of energy radiated from the build plane during one or more scans and determining area of the build plane traversed during the one or more scans. In various embodiments the one or more parameters includes TEP that includes identifying spectral peaks associated with material properties of a batch of powder and selecting a first wavelength and a second wavelength spaced apart from the first wavelength, and determining an amount of energy radiated from the build plane based upon a ratio of energy radiated at the first wavelength to energy radiated at the second wavelength.

In some embodiments the machine learning algorithm includes one or more training parameters based on a known-defective part. In various embodiments the one or more training parameters includes a void. In some embodiments the one or more training parameters includes an inclusion. In various embodiments the one or more sensors includes an on-axis photodetector.

In some embodiments an additive manufacturing system comprises an energy source arranged to fuse metallic powder, a sensor arranged to detect electromagnetic energy emitted during the fusing of the metallic powder and a processor that receives data from the sensor and employs a trained machine learning algorithm to detect a defect in the fused metallic powder. In various embodiments the trained machine learning algorithm determines a type of the defect. In some embodiments the type of defect includes a lack of fusion of the metallic powder defect, a porosity defect or an inclusion defect. In various embodiments the processor is configured to calculate one or more parameters based at least in part on the electromagnetic energy.

In some embodiments the one or more parameters includes determining a thermal emission density (TED) that includes measuring an amount of energy radiated from the fused metallic powder during one or more scans of the energy source and determining area of a build plane traversed during the one or more scans. In various embodiments the one or more parameters includes identifying spectral peaks associated with material properties of a batch of the metallic powder and selecting a first wavelength and a second wavelength spaced apart from the first wavelength, and determining an amount of energy radiated from a build plane based upon a ratio of energy radiated at the first wavelength to energy radiated at the second wavelength.

In some embodiments the one or more training parameters are derived from a known-defective part having at least one region having lack of fusion of the metallic powder. In various embodiments the one or more training parameters are derived from a known-defective part having at least one inclusion. In some embodiments the one or more training parameters are derived from a known-defective part having at least one region having porosity. In various embodiments the one or more sensors includes an on-axis photodetector. In some embodiments the trained machine learning algorithm is based on a random forest model.

Numerous benefits are achieved by way of the present invention over conventional techniques. For example, embodiments of the present invention provide the ability to detect defects in-process and correct them or stop the build of the part resulting in significant improvements in manufacturing efficiency. Embodiments of the present invention also provide the ability of defect identification so an operator can make a more informed decision during the build to repair the part or discontinue building the part.

BRIEF DESCRIPTION OF THE DRAWINGS

FIG. 13H shows the prediction on PrintRite3D® visualization generated by the GP model, according to embodiments of the disclosure;

DETAILED DESCRIPTION

Some embodiments of the present disclosure relate to methods of detecting defects in a part that is made using an additive material manufacturing system. While the present disclosure can be useful for a wide variety of configurations, some embodiments of the disclosure are particularly useful for using one or more in-process metrics along with machine learning to detect and identify the type of defect within parts made by an additive manufacturing system, as described in more detail below.

Three-dimensional defect morphology and its relationship with in-process data generated by an additive material manufacturing system can be difficult to be interpreted by humans. Even when multiple metrics are generated from the in-process data it can be difficult for an operator to use them to predict where anomalies are likely to have occurred in a part and even more difficult to predict the type of defect that occurred. More specifically a human operator may have difficulty extracting subtle changes within a particular metric or in relationships between multiple metrics that indicate a defect has occurred and/or indicate the type of defect that has occurred. Conversely, machine learning algorithms can be effectively trained with known good parts and known bad parts to effectively recognize these subtle changes and detect that a defect has occurred. Further, parts having a known type of defect such as lack of fusion, porosity, keyhole and contamination can be used to train the machine learning algorithm to identify a particular type of defect. With the added knowledge of the type of defect that has occurred, a more informed decision can be made as to whether the part should continue in the build process, be rejected or be repaired. This significantly improves the cost and efficiency of additive manufacturing systems as compared to sending samples for external analysis.

Figure 1A:
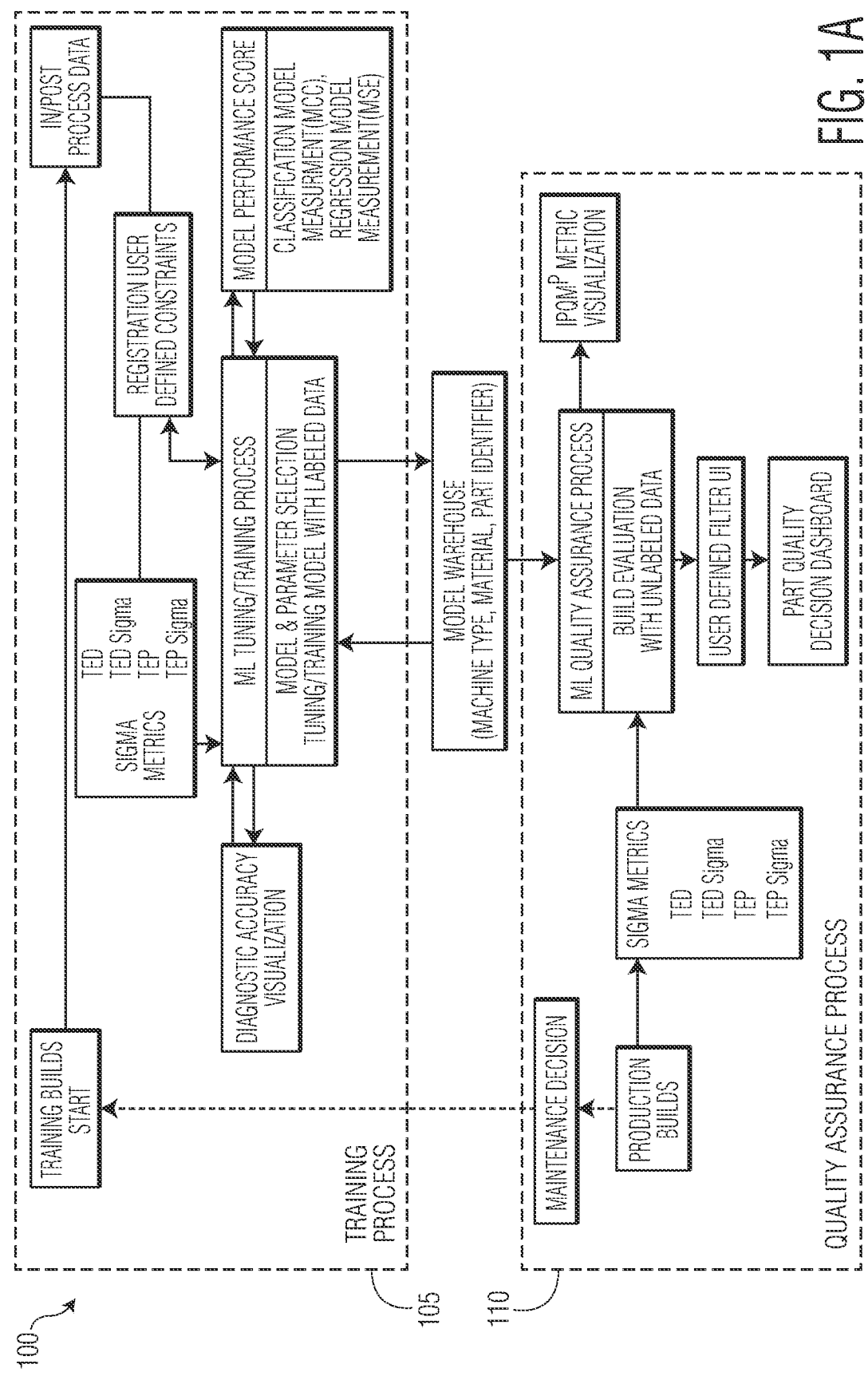
FIG. 1A illustrates a simplified diagram of a machine learning algorithm that can be used to detect and identify defects generated by an additive manufacturing system, according to embodiments of the disclosure.
Figure 1B:
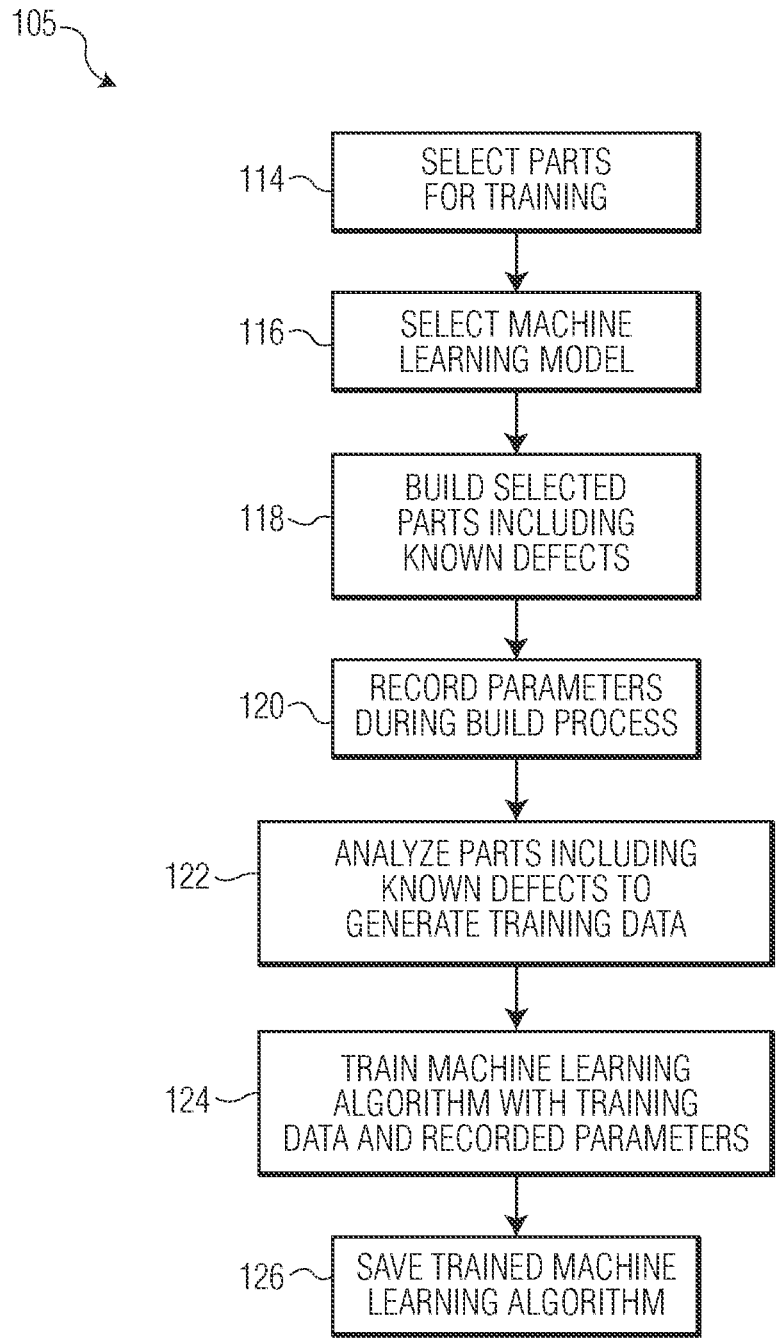
FIG. 1B describes a training process that can be used for the machine learning algorithm described in FIG. 1A.

FIG. 1A illustrates a visual summary of one embodiment of a machine learning algorithm 100 that can be used to detect and identify defects generated by an additive manufacturing system. As shown in FIG. 1, algorithm 100 is broken up into a training process 105 and a quality assurance process 110. Starting first with the training process, training builds of parts manufactured with the additive manufacturing system are performed. During the manufacturing, in process metrics, labeled as Sigma Metrics in FIG. 1, are collected. In some embodiments these training builds can have induced defects such that known defects are introduced into the parts and can be used to train the machine learning algorithm, explained in greater detail below. The parts having known defects can then be analyzed with either non-destructive or destructive tests to verify and map the location of the defects. This data can be overlaid with the in-process metrics and used as "training data" to train the machine learning algorithm. Training process 105 is described in more detail in FIG. 1B.

As described herein, a machine learning algorithm is an application of artificial intelligence that provides systems the ability to automatically learn and improve from experience without being explicitly programmed. Typically, machine learning algorithms build a mathematical model based on sample data, often called "training data", to make predictions or decisions without being explicitly programmed to do so.

In some embodiments different part geometries, different materials, etc. can be used to create different machine learning algorithms that can be tailored to specific parts, specific materials or other variables. In other embodiments generic machine learning algorithms can be developed that can handle varied part geometries and materials.

Figure 1C:
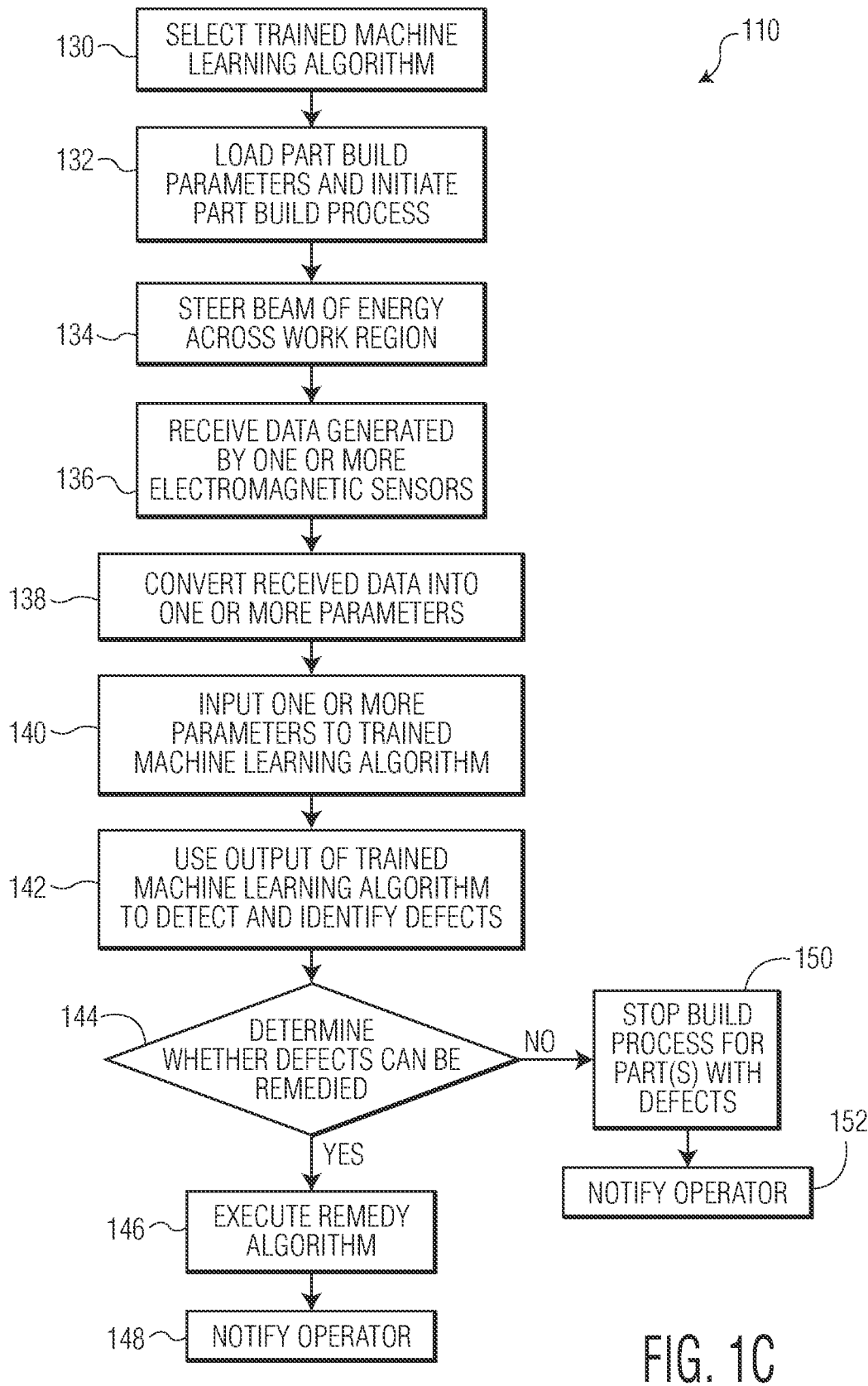
FIG. 1C describes an example process of employing a machine learning algorithm described in FIG. 1A.

Now transitioning to the quality assurance process 110 in FIG. 1, a machine learning algorithm can be selected from a model warehouse. Production builds can be initiated and in process metrics, labeled as Sigma Metrics in FIG. 1 can be collected during the build process. These metrics can be used as an input into the machine learning algorithm, and the machine learning algorithm can output real-time data detecting and/or identifying defects in the production builds. As shown in FIG. 1 the output from the machine learning algorithm can be displayed to a user via a "Part Quality Decision Dashboard" or through a "Visualization" user interface. As would be appreciated by one of skill in the art having the benefit of this disclosure, various other methods of displaying and using the output of the machine learning algorithm can be used and are within the scope of this disclosure. Thus, by employing a trained machine learning algorithm, real-time defect analysis and/or identification can be performed, and an operator, or the additive manufacturing system can make decisions with regard to the defective parts. In one example the system can take action to repair the defect, while in another example the system can cease building the defective parts to increase throughput and minimize waste. In further embodiments the defective parts can be identified and either rejected or analyzed with a post-process system such as computed tomography. Quality assurance process 110 is described in more detail in FIG. 1C.

In this example, in-process metrics that are used both for training and for real-time metrics analyzed by the machine learning algorithm during production builds are thermal energy density (TED), TED Sigma, thermal energy Planck (TEP) and TEP Sigma. TED is a thermal energy density metric that indicates the thermal energy within a given area and TEP is a metric that evaluates a temperature of the plume using two or more blackbody radiation frequencies. These and other in-process metrics are described in U.S. Pat. Nos. 10,639,745 (TEP) and 10,479,020 (TED) and in U.S. patent application Ser. No. 16/182,478 (peak temperature), which are incorporated by reference herein in their entirety for all purposes. As would be appreciated by one of skill in the art having the benefit of this disclosure, any in-process metrics can be used as input to the machine learning algorithm and are within the scope of this disclosure.

FIG. 1B describes one example training process 105 for a machine learning algorithm, according to embodiments of the disclosure. As described above, the machine learning algorithm can be specifically designed for a particular part geometry, a particular material or any other particular parameter. For example, a specific algorithm may be trained for an aluminum based material and a separate specific algorithm may be trained for a tungsten based material because of the significantly different process temperatures involved and/or the different emission characteristics of the material during the fusion process. In another embodiment a generic algorithm can be trained that is effective for various different steel alloys or for parts having a particular geometry.

As shown in FIG. 1B, training process 105 includes a first step 114 in which parts are selected for training. In some embodiments, for example when training a generic algorithm, various different part geometries may be selected, however in other embodiments the same part may be selected for the training process.

In step 116 a machine learning model is selected for the training. In some embodiments the machine learning model can include one or more of the following models: Linear Regression, Logistic Regression, Decision Tree, SVM, Naive Bayes, kNN, K-Means, Random Forest, Extremely Random Forest, Dimensionality Reduction Algorithms, Gradient Boosting algorithms, GBM, XGBoost, LightGBM, CatBoost or any other suitable model.

In step 118 parts are built by the additive manufacturing system. In some embodiments the build includes both parts that incorporate known defects and parts that have no defects. More specifically, in some embodiments known defects such as embedded keyhole and lack of fusion anomalies can be induced in the parts by programming the energy source to emit a reduced power in these regions. Parts with induced gas porosity can be built by introducing anhydrous sodium acetate. Parts with inclusions can be built by adding tungsten powder. These are examples of how one or more defects can be introduced into parts, however other embodiments may use different methods to introduce defects.

In step 120 while the parts in step 118 are being built by the additive manufacturing system, one or more parameters are recorded. More specifically, in some embodiments one or more electromagnetic sensors are used to record electromagnetic emission data from the weld pool during fabrication of the parts. The data can be transformed into one or more parameters that can be representative of conditions of the weld pool. For example, in some embodiments the parameters are TED or TEP which are explained in more detail below. In other embodiments temperature, temperature variations, changes in temperature with time, etc. can comprise the electromagnetic emission data. In some embodiments the one or more parameters are associated with build coordinates of each part, thus the one or more parameters are "mapped" to each part in the build.

In step 122, after the build is completed the parts are analyzed and any defects are "mapped". More specifically, in some embodiments computer-aided tomography (CT) is used to evaluate each part and map the one or more defects onto the part geometry.

In step 124 the machine learning model is trained to create a trained machine learning algorithm. More specifically, in some embodiments the one or more mapped parameters are loaded into the model and overlaid with corresponding mapped defect data from the CT evaluation. Thus the model can compare regions of the parts where defects occur with regions of the parts where defects do not occur and determine subtle shifts in the mapped parameters, or shifts in relationships between the mapped parameters to identify defect signatures. Further, the model can be trained with different types of defects. For example the model can be trained to recognize a keyhole defect, then improved to differentiate a keyhole defect from a gas porosity defect.

In step 126 the trained machine learning algorithm can be saved and used as either a generic algorithm or a specific algorithm for use in future production builds. It will be appreciated that process 105 is illustrative and that variations and modifications are possible. Steps described as sequential may be executed in parallel, order of steps may be varied, and steps may be modified, combined, added or omitted.

As shown in FIG. 1C, a training process such as training process 105 can be employed during a production build for in-process quality control as shown in quality assurance process 110. In some embodiments training process 105 can be performed by a computing system that controls an additive manufacturing system. In some embodiments the computing system may include one or more processors, as further described in FIG. 17.

In step 130 a trained machine learning algorithm from training process 105 can be selected. In some embodiments a generic algorithm can be used while in other embodiments a specific algorithm that is suited for a particular part geometry, material or other parameter is selected.

In step 132 the parameters for building the production parts are loaded into the system and the build process is initiated. In some embodiments the loaded parameters include part geometry, for example in an STL or similar file format.

In step 134 the computing system steers a beam of energy across a work region fusing metallic powder together in sequential layers to form one or more production parts according to the loaded parameters.

In step 136 one or more electromagnetic sensors record electromagnetic data from the weld pool generated by the beam of energy fusing the metallic powder together. The system maps the data to the part geometry (e.g., to the STL file coordinates).

In step 138 the system coverts the received data from the electromagnetic sensors to one or more parameters. In one example the received data is in the form of a variable voltage received from a pyrometer. The variable voltage is transformed into a time varying temperature that is mapped onto the parts (e.g., onto the STL file coordinates). In another embodiment the received data is converted into a TED and/or a TEP parameter, which are explained in more detail below. Other suitable parameters may be derived, recorded and mapped onto the parts.

In step 140 the one or more parameters are used as input to the trained machine learning algorithm. The machine learning algorithm compares the parameters with its learned algorithm and generates an output.

In step 142 the output of the trained machine learning algorithm is used to detect and identify defects within the one or more parts of the build. More specifically, in some embodiments the electromagnetic data is generated real-time, the one or more parameters are immediately generated and input into the machine learning algorithm so defects can be detected real-time as the part is being built. Further, in some embodiments the type of defect can be detected real-time.

In step 144 the system determines if the type of defect can be remedied. In some embodiments for example, the type of defect is determined to be lack of fusion and is mapped to specific coordinates on the part. The system can determine that this type of defect can be remedied and can proceed to step 146 and steer the energy beam back across that region to fuse the material. In another embodiment a new layer of powder can be deposited and the system can increase the power while fusing that region to fuse the underlying layer and remedy the defect. In step 148 the operator can be notified of the remedy. In other embodiments the system may stop and request authorization from the operator before executing the remedy algorithm.

Alternatively in step 144 the system may determine that the defect cannot be remedied and may proceed to step 150 which stops the build process for the part or parts that include the defect. In step 152 the operator can be notified and can make a decision to completely stop building the defective parts to improve the efficiency of the system or to remedy the defects and continue building. It will be appreciated that process 110 is illustrative and that variations and modifications are possible. Steps described as sequential may be executed in parallel, order of steps may be varied, and steps may be modified, combined, added or omitted.

The following portion of the disclosure describes an experimental setup that can be used to train and test one embodiment of a machine learning algorithm for an additive manufacturing system. Other embodiments can use other suitable processes to train and employ machine learning algorithms for detection and/or identification of part defects.

Training Setup

Figure 2A:
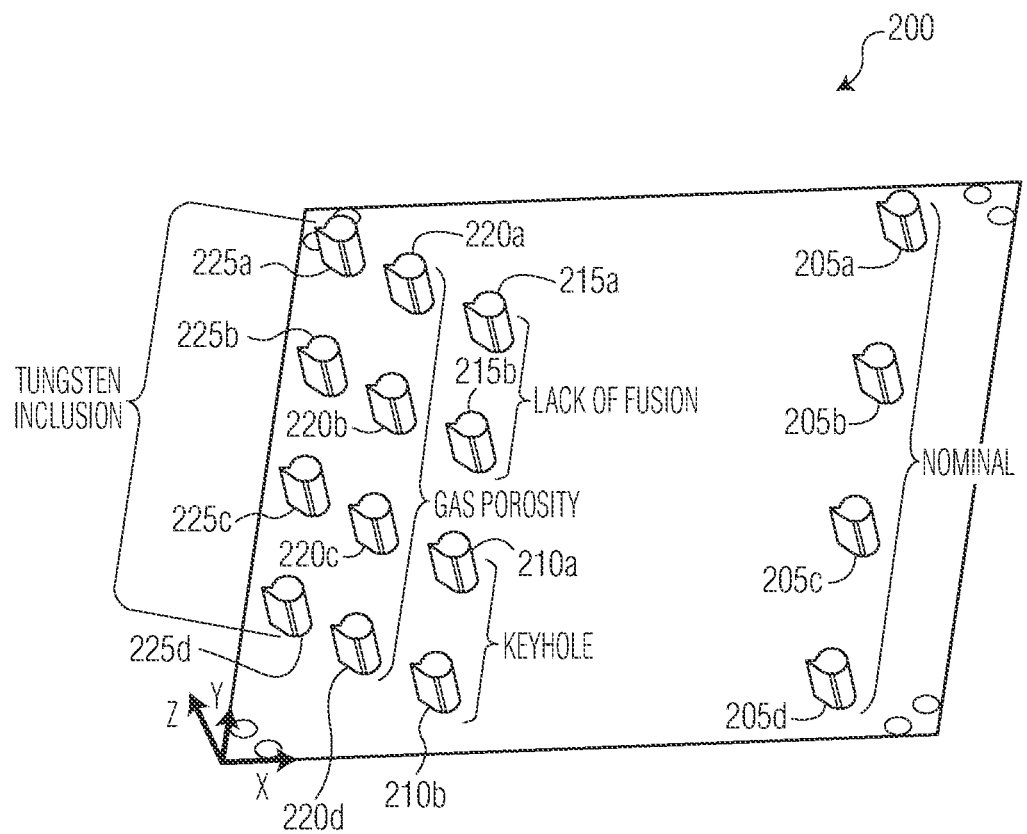
FIG. 2A illustrates an isometric image of an example training build that is designed to exhibit four common types of part anomalies, according to embodiments of the disclosure.
Figure 2B:
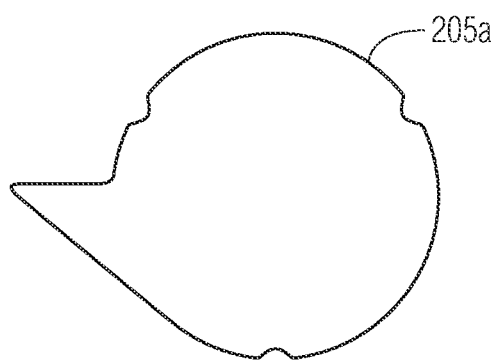
FIG. 2B shows a top down visualization of one of the control parts used in the training build of FIG. 2A.

FIG. 2A illustrates an isometric image of an example training build 200 that is designed to exhibit four common types of part anomalies. The training build can be performed on any suitable additive manufacturing system. In one example embodiment it can be performed on an EOS M290 equipped with Sigma Labs PrintRite3D® system. In this particular example, metallic powder from PraxAir was used and is designated as Titanium Ti-6Al-4V alloy powder with a particle size distribution of 23-50 microns. Training build consists of five separate regions. At the far right a nominal control group 205 is shown. Two parts each of embedded keyhole 210 and lack of fusion 215 which include spherical voids ranging from 1.00 mm-0.050 mm diameter spheres. These anomalies can be induced in the parts by programming the energy source to emit a reduced power in these regions. Fourth was a set of parts with induced gas porosity 220 due to the introduction of anhydrous sodium acetate at three discrete layer heights at an amount per layer of 1.0 g, 0.5 g and 0.25 g. Four inclusion defect parts 225 were created by adding tungsten powder with a particle distribution of 20-50 microns at the same 3-layer heights with an amount per layer of 1.0 g, 0.5 g and 0.25 g. All main body scans were standard EOS parameters. FIG. 2B shows a top down PrintRite3D® visualization of one of the control parts 205a.

CT Analysis

Computed Tomography (CT) was used as the ground truth for generating training labels to be used in a supervised machine learning algorithm. After running the build, the PrintRite3D® in-process metrics were examined and one part for each anomaly type was chosen based on metric activity. The physical specimens and Standard Tessellation Language (STL) files giving the build specifications were converted to STL files showing the location and morphology of detected anomalies registered to the same coordinates as the STL specifications.

Lack of Fusion

Figure 3:
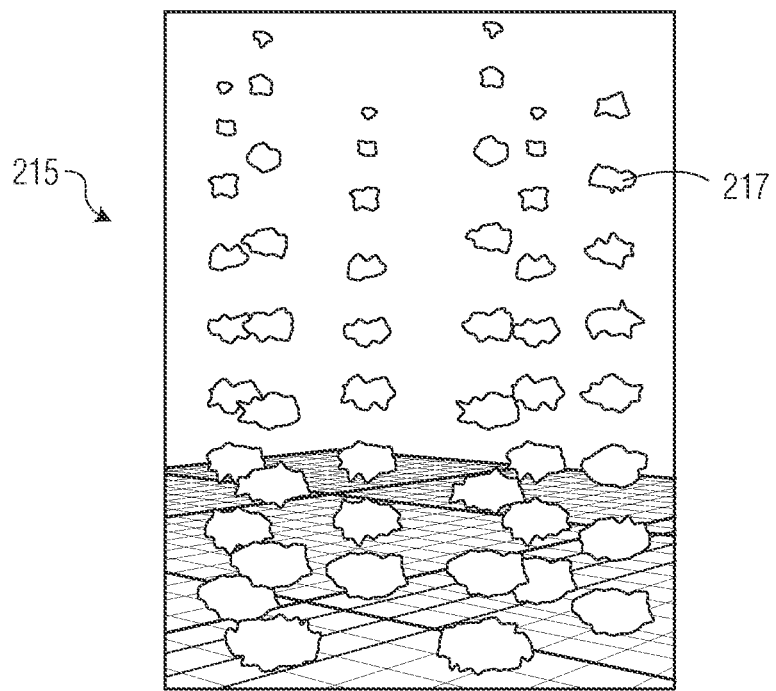
FIG. 3 shows tessellations of CT data for lack of fusion parts used in the training build of FIG. 2A.

FIG. 3 shows tessellations of the CT data for lack of fusion parts 215. As shown in FIG. 3, when too little energy density is delivered to a part location the powder can fail to fuse. To create lack of fusion anomalies, the M290 printer was programmed to use low energy parameters to produce spheres of lack of fusion anomalies. The array of regions 217 corresponds to the programmed lack of fusion spheres with decreasing size toward the top. Groups of six spheres were arranged in a hexagonal pattern and ten regions with decreasing sphere diameter were laid out at different heights in each part. The sphere diameters ranged from 0.9 mm to 0.05 mm. One part is for inclusions which was not included in the analysis. The second part is for porosities, which are more appropriate for describing the lack of fusion anomalies.

Gas Porosity

Figure 4:
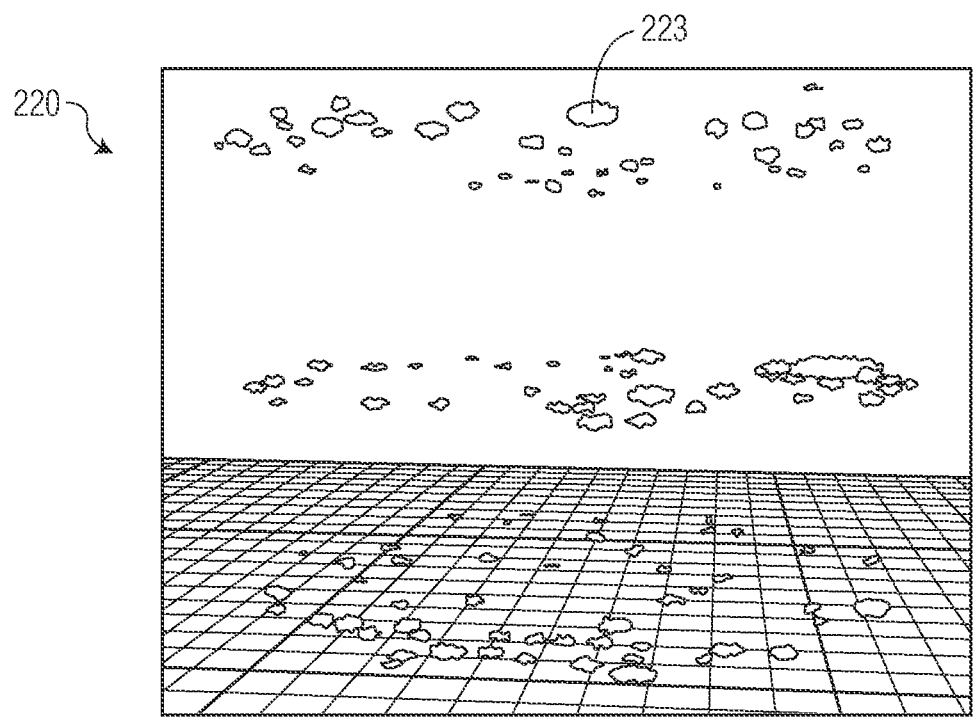
FIG. 4 shows tessellations of the CT data for gas porosity parts used in the training build of FIG. 2A.

FIG. 4 shows tessellations of the CT data for gas porosity parts 220, with regions 223 corresponding to regions of porosity. There are several mechanisms that can cause microstructural porosity in additive manufacturing. In this experiment trapped gas was emulated by dosing the part with foreign particles with low boiling point and high vapor pressure with the expectation that the evaporated particles would leave small pores in the product. The M290 printer was paused before spreading the low boiling point powder at three different layers. The build chamber was opened, and sizes of 1 g, 0.5 g and 0.25 g of anhydrous sodium acetate CH3COONa powder were deposited in the four parts. Of the four gas porosity parts, the part at the top of the plate was selected for CT analysis because the in-process metrics showed stronger signals at the programmed anomalies. The Metrology Center reported the anomalies for this part in an STL files. FIG. 4 shows tessellations of the voids because of the contaminant particle injections from CT data distributed in three layers of a gas porosity part.

Keyhole

Figure 5:
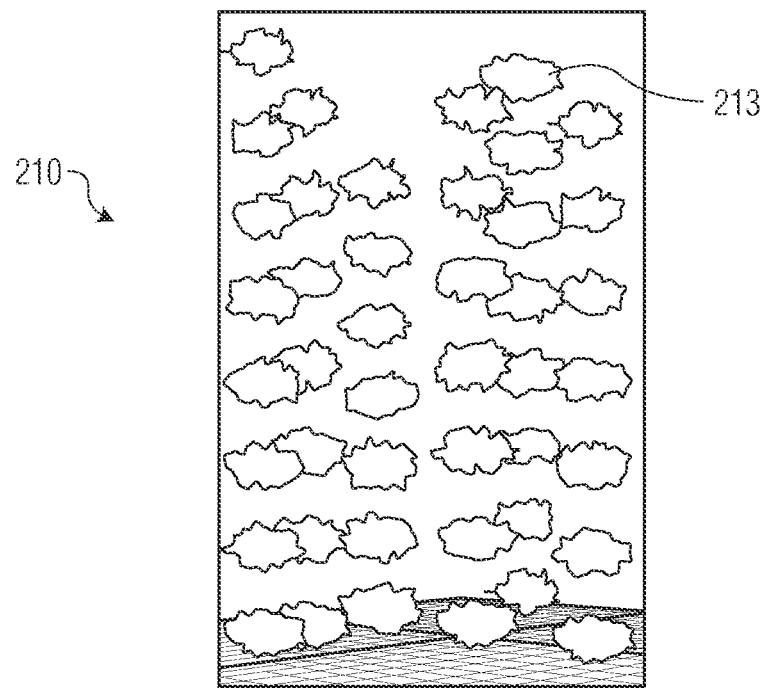
FIG. 5 shows tessellations of the CT data for keyhole parts used in the training build of FIG. 2A.

FIG. 5 shows tessellations of the CT data for keyhole parts 210 with regions 213 corresponding to keyhole regions. When too much laser energy density is delivered to a part location, a void can remain in the part. The M290 printer was programmed to use relatively high energy parameters to produce spheres of keyhole anomalies. Groups of six spheres were arranged in a hexagonal pattern and ten regions with decreasing sphere diameter were laid out at different heights in the build. The sphere diameters ranged from 0.9 mm to 0.05 mm. Of the two keyhole parts, the part at the bottom of the plate was selected for CT analysis because the in-process metrics show stronger signals at the programmed anomalies. The Metrology Center reported the anomalies for the keyhole part in two STL files. One part is for inclusions which was not included in the analysis. The second part is for porosities, which are more appropriate for describing the keyhole anomalies.

Tungsten Inclusion

Figure 6:
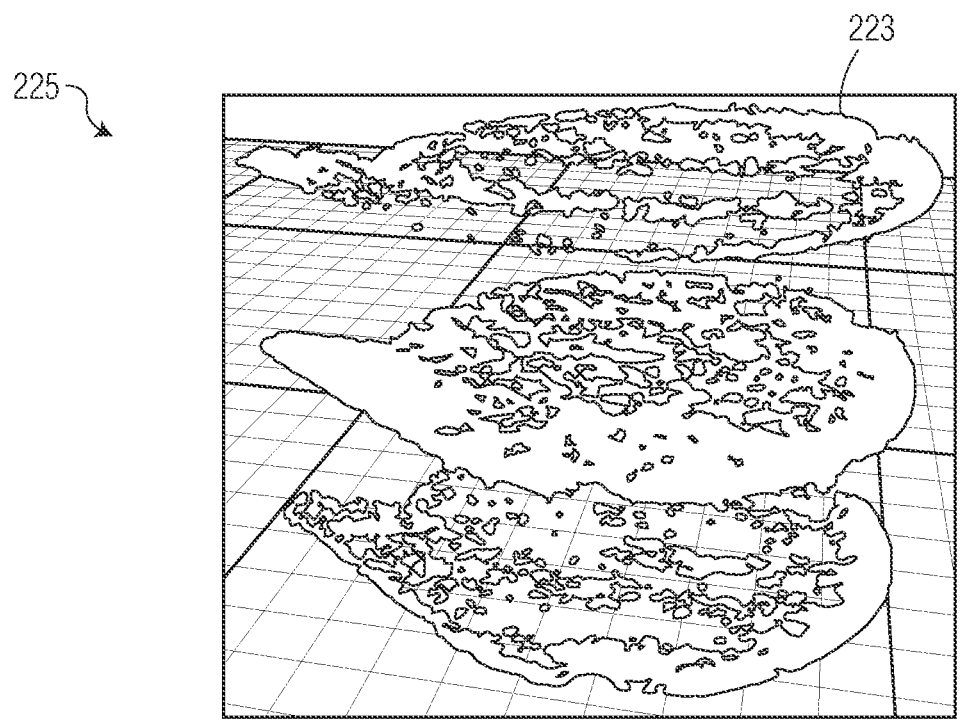
FIG. 6 shows tessellations of the CT data for inclusion parts used in the training build of FIG. 2A.

FIG. 6 shows tessellations of the CT data for inclusion parts 225 with regions 223 corresponding to inclusion regions. When foreign particles with high melting point contaminate a part, the particles can be fixed in the product which can result in crack initiation sites degrading part performance. The M290 printer was paused before spreading powder at three different layers. The build chamber was opened, and graduated amounts of Tungsten powder were deposited in four parts. Of the four tungsten inclusion parts, the second one from the top of the plate was selected for CT analysis because the in-process metrics show stronger signals at the programmed anomalies.

Registration of Results

The CT results were reported in the STL files illustrated in the previous section. The anomalies appear as tessellations around the detected voids and inclusions. The coordinate system in the STL files was adjusted to be the same as the coordinate system used in the STL files specifying the build parameters.

The PrintRite3D® in-process metrics (e.g., TED, TED Sigma, TEP and TEP Sigma) are recorded through on-axis photodetectors that closely follow the movements of the laser. Minor differences can occur through distortions of the optical system and through shrinkage and other mechanical strains introduced by cooling of the material and by separation of the part from the build plate.

The ranges of the x, y, and z coordinates in the STL files were extracted, and were matched against the x, y, and layer coordinates in the TED metrics. The average of the differences was used as offsets on the STL coordinates to fine tune the matching of the coordinate systems.

The tessellations representing the anomalies span several layers; they were projected onto individual layers as polygons. Labels were generated by filling layer grid cells with weighted sums calculated as the lengths of the enclosing polygons, to emphasize the weight of larger voids. Points on the perimeters of the polygons were added in that were omitted in the polygon representation. These combined weights can be large positive integers, so they were normalized with the function:

$$\frac{2}{e^{-x}+1} - 1, \text{ where } x = \text{label value}$$

This resulted in label values that can be treated as probabilities in the range 0.0 to 1.0.

Printrite3D® ML Models

The features available for ML models within the Printrite3D system are the in-process metrics from the build. The four primary metrics TED, TED Sigma, TEP, and TEP Sigma that are collected on grid cells with internal metrics that are used to calculate TEP Sigma, namely the counts and the tep_sums. Since there could be inter-layer interactions, these six features were extended with the corresponding values on the previous layer. During training of the models, the inclusion of these features and other potential candidates were evaluated by checking feature importance reported by the models. One of skill in the art having the benefit of this disclosure will appreciate that any in-process metrics could be used as input into the machine learning algorithm and this disclosure is in no way limited to the specific in-process metrics available within the Printrite3D system.

Ensemble methods that could be run in parallel on multiple processors were investigated. In this example a random forest of classification machine learning model was chosen, however one of ordinary skill in the art having the benefit of this disclosure will appreciate that any other suitable machine learning model could be used. One suitable model class is a random forest regressor. To improve the model, in some embodiments, it can be augmented by decision trees or other ensemble methods such as extra trees, bagging, or boosting. The grid cells in the layer in parts of a build amount to tens of millions of data points, so the ensemble methods may also be suitable because of their performance at scale.

Methods were selected that could be run in parallel on multiple processors. For this embodiment, it was found that current implementations of the boosting methods were not fast enough. In this example embodiment, gradient boosting and bagging gave fairly good performance in terms of accuracy and speed, but not as good as random forest or extremely randomized trees. In the end, it was determined that random forest was more accurate than extremely randomized trees on our data, so the sklearn.ensemble.RandomForestClassifier was selected for this example embodiment, however other models may also be suitable.

The ensemble of trees selected are controlled by the random_state parameter, which then propagates new random states to each component estimator. These component estimators are decision trees with independent choices on subsets of the features to use when branching to fit a data set. The prediction at each point is computed as the average of the predictions of the individual trees at that point. It was found that training with twice as many estimators as desired and then pruning the weaker trees improved accuracy, however in other embodiments different techniques can be used.

To ameliorate over-training, in this embodiment 10-fold cross validation on the data was used. This means that the data set was partitioned randomly into 10 equal folds, and for each test fold training was performed on the other 9 folds and evaluation was performed on the selected test fold. Other model parameters were also used for regulating the growth of the trees.

A pair of cost functions were developed to measure residuals in the positive and negative directions. In this embodiment missing an anomaly was deemed more important than mis-flagging non-anomalous conditions, so the negative residuals were weighted as 10 times more expensive than the positive residuals to focus on the false negatives. The total cost is then the sum of the positive residuals and the weighted negative residuals, and this was chosen as the primary metric when choosing models and tuning them. Note that these costs are unitless and do not reflect dollar cost.

Binary classification residuals are calculated as the differences between binary labels and binary predictions, but since the labels are probabilities, prediction probabilities were used and the residuals were calculated as floating-point differences. Binary residual values collapse to −1, 0, and 1, but probability residuals cover the full range and can distinguish small and large differences.

In this example embodiment, the number of grid cells labeled anomalous is smaller than the number labeled normal, but least-squares fitting may be used when the conditions are balanced. The normal data was sub-sampled and the anomalies with replacement were over-sampled to bring the counts into approximate balance, and then class weights were calculated to account for any remainder. For example, when there are 100 times more normals than anomalies, the process might sub-sample 20% of the normals and over-sample the anomalies 5 times, and then set the class weight for anomalies as 4 times more important than normals to complete the balance.

Figure 7:
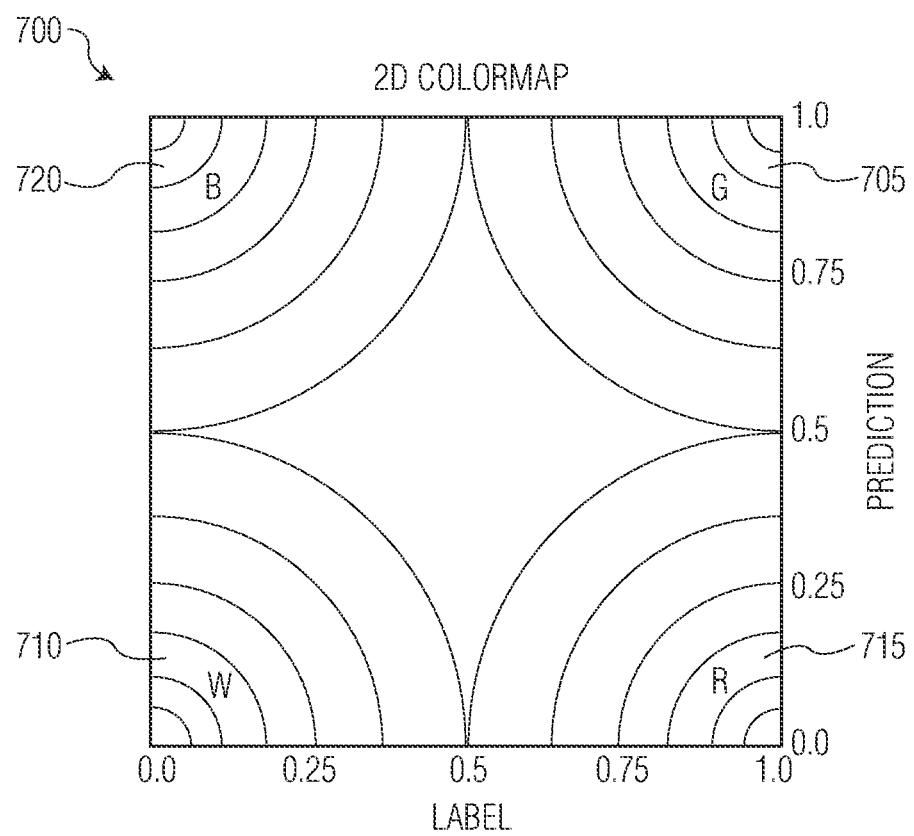
FIG. 7 illustrates an example heat map that can be used to diagnose how well model prediction images compare to training labels, according to embodiments of the disclosure.

FIG. 7 illustrates an example heat map 700 that can be used to diagnose how well model prediction images compare to training labels. The four-color classification map shown in FIG. 7 can be used where green indicates True Positive 705, white indicates True Negative 710, red indicates False Negative 715, and blue indicates False Positive 720. Since the labels take floating point values in the range of 0.0 to 1.0 and the predictions represent the probabilities of a grid cell being an anomaly, heatmap 700 blurs the colors between the categories. One of skill in the art having the benefit of this disclosure will appreciate that other types of anomaly identification methods can be used and are within the scope of this disclosure.

Lack of Fusion Model

Figure 8A:
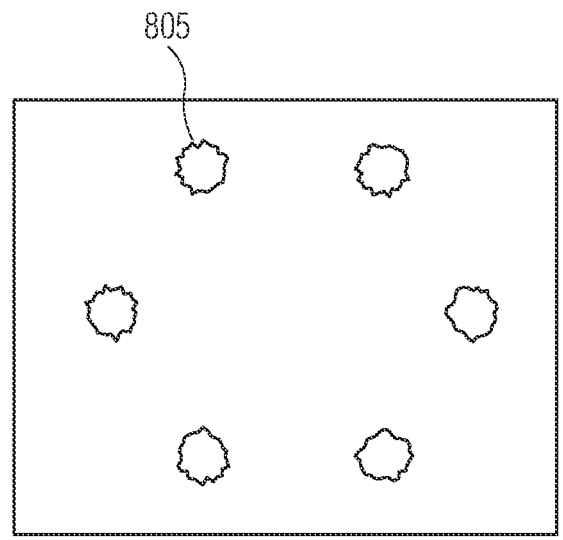
FIG. 8A shows lack of fusion anomalies in a CT visualization, according to embodiments of the disclosure.
Figure 8B:
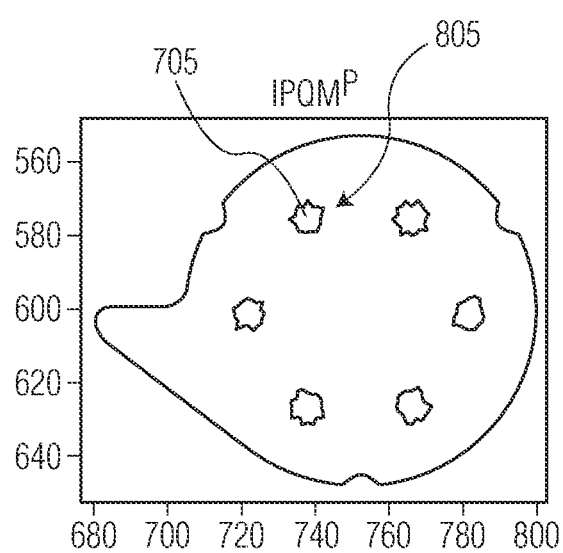
FIG. 8B shows a machine learning layer diagnostic visualization using the heatmap of FIG. 7.

FIG. 8A shows the lack of fusion anomalies 805 in the CT visualization. The first machine learning model was trained with lack of fusion parts 215 (see FIG. 2A). FIG. 7B shows the machine learning algorithm prediction diagnostic visualization using heatmap 700 of FIG. 7. As shown in FIG. 8B, the lack of fusion regions 805 are predominantly shown in Green corresponding to True Positive 705. The 10-fold cross validation was applied when calculating the negative mean squared error and evaluated as the mean value of the ten numbers. For the cost function, the cost values were normalized to compensate for the cross validation divisions. Following are the evaluation values for the lack of fusion model:

test neg_mean_squared_error mean: −0.010 (+/−0.0001)
test total_cost mean: 364079.345 (+/−1535.2343)

Gas Porosity Model

Figure 9A:
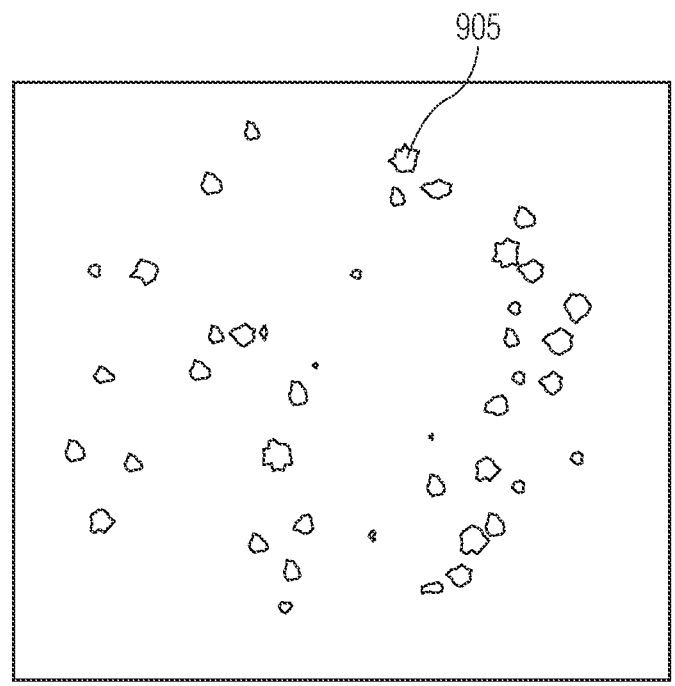
FIG. 9A shows the gas porosity anomalies in the CT visualization, according to embodiments of the disclosure.
Figure 9B:
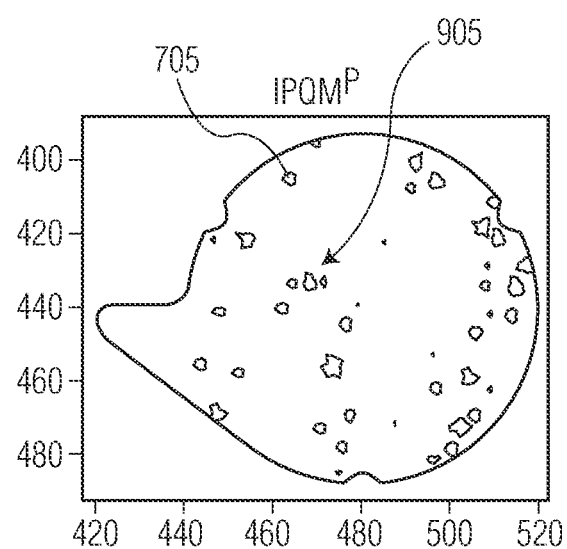
FIG. 9B shows the machine learning layer diagnostic visualization using the heatmap of FIG. 7.

FIG. 9A shows the gas porosity anomalies 905 in the CT visualization. The second machine learning model was trained on gas porosity parts 220 (see FIG. 2) caused by anhydrous sodium acetate powder. FIG. 9B shows the machine learning layer diagnostic visualization with heatmap 700 of FIG. 7. As shown in FIG. 9B, the regions of gas porosity 905 are predominatley shown in Green corresponding to True Positive 705. The following are the 10-fold cross validation scores for the GP model:

test neg_mean_squared_error mean: −0.003 (+/−0.0000)
test total_cost mean: 117800.665 (+/−526.8486)

Keyhole Model

Figure 10A:
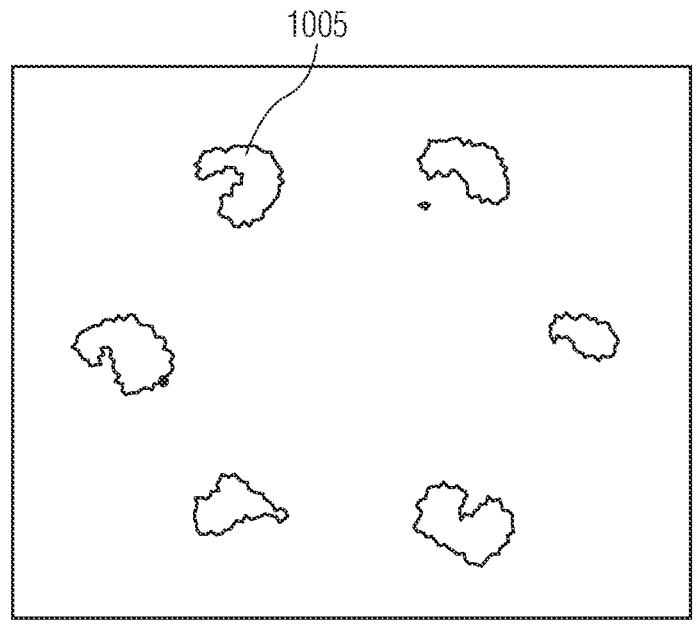
FIG. 10A shows the keyhole anomalies in the CT visualization, according to embodiments of the disclosure.
Figure 10B:
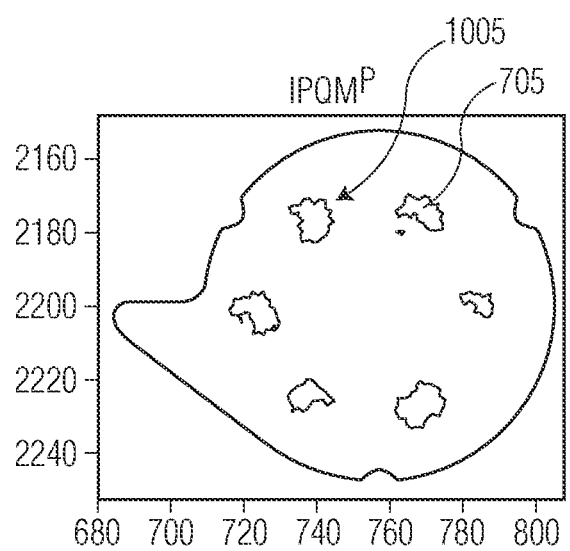
FIG. 10B shows the machine learning prediction diagnostic visualization using the heatmap of FIG. 7.

FIG. 10A shows the keyhole anomalies 1005 in the CT visualization. The third machine learning model was trained with keyhole parts 210 (see FIG. 2) caused by reduced power from the energy source. FIG. 10B shows the ML prediction diagnostic visualization with the heatmap 700 of FIG. 7. As shown in FIG. 10B, the keyhole regions 1005 are predominantly shown in Green corresponding to True Positive 705. The following are the 10-fold cross validation scores for the GP model:

test neg_mean_squared_error mean: −0.011 (+/−0.0001)
test total_cost mean: 413533.676 (+/−1545.1225)

Tungsten Model

Figure 11A:
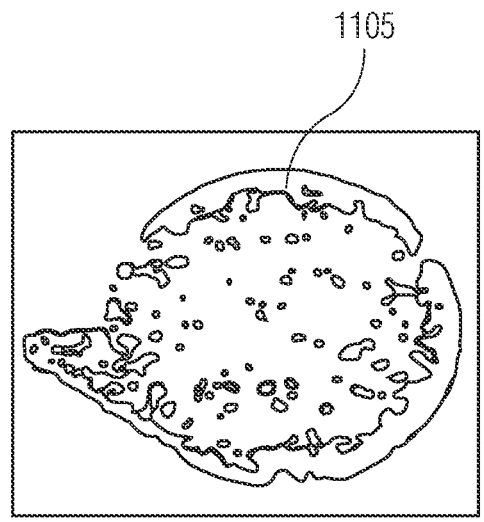
FIG. 11A shows the tungsten inclusion anomalies in the CT visualization, according to embodiments of the disclosure.
Figure 11B:
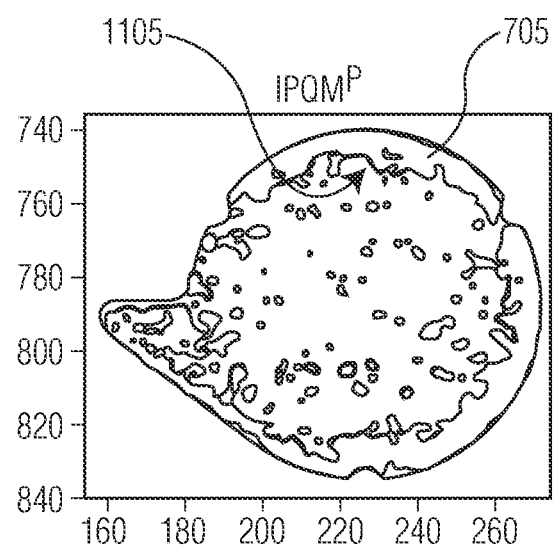
FIG. 11B shows the machine learning prediction diagnostic visualization using the heatmap of FIG. 7.

FIG. 11A shows the tungsten inclusion anomalies 1105 in the CT visualization. The fourth machine learning model was trained with inclusion parts 225 (see FIG. 2) caused by adding tungsten powder to three layers. FIG. 11B shows the machine learning prediction diagnostic visualization with heatmap 700 of FIG. 7. As shown in FIG. 11B, the inclusion regions 1105 are predominantly shown in Green corresponding to True Positive 705. The following are the 10-fold cross validation scores for the W model:

test neg_mean_squared_error mean: −0.023 (+/−0.0001)
test total_cost mean: 526917.446 (+/−2611.9907)

Adversarial Modeling

The models can be trained to recognize their anomaly types and avoid flagging other anomaly types. However, rejection of other anomaly types can be enhanced by explicitly training against them. This section shows how to perform adversarial enhancement of the machine learning models.

Lack of Fusion Model

Figure 12A:
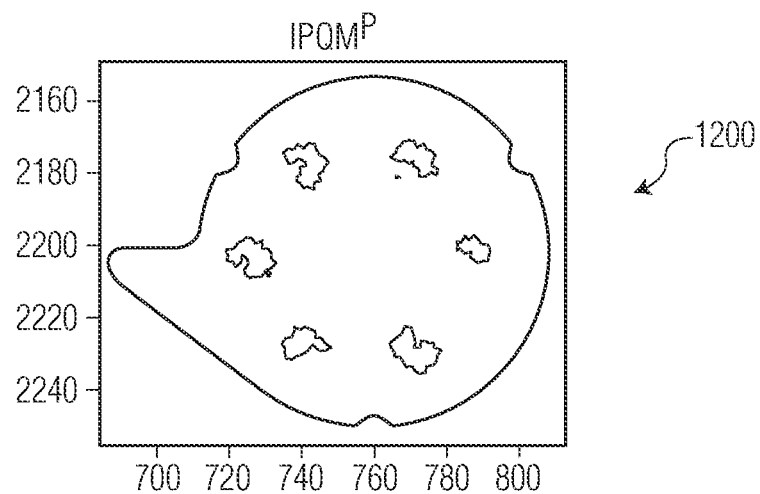
FIG. 12A shows the test layer visualization with respect to keyhole defects, according to embodiments of the disclosure.
Figure 12B:
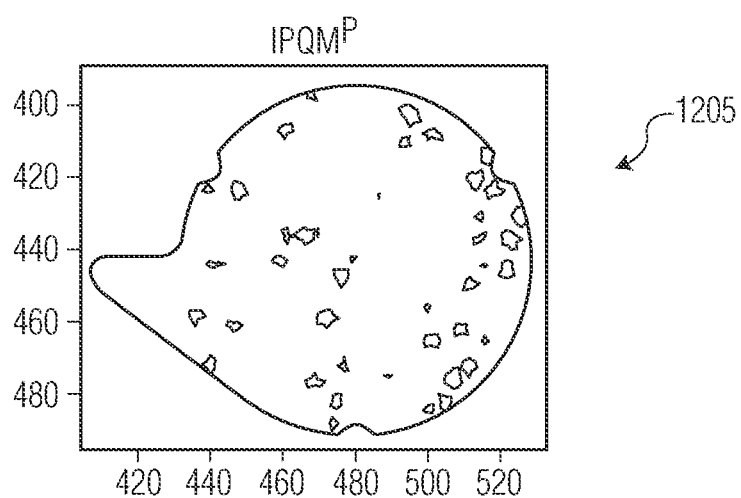
FIG. 12B shows the test layer visualization with respect to gas porosity, according to embodiments of the disclosure.
Figure 12C:
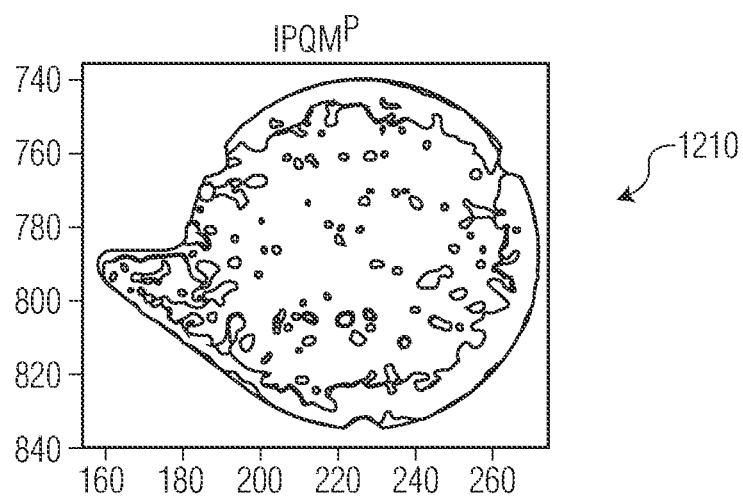
FIG. 12C shows the test layer visualization with respect to inclusions 1210, according to embodiments of the disclosure.

Table 1 shows the layer cost values of lack of fusion (LOF) model testing the parts with four different anomaly types. FIG. 12A shows the test layer visualization with respect to keyhole 1200, FIG. 12B shows the test layer visualization with respect to gas porosity 1205, FIG. 12C shows the test layer visualization with respect to inclusions 1210. The cost calculations are shown below in Table 1. The low cost value on the same type (e.g., lack of fusion in this case) and the high cost value on the other types imply that the model trained with the lack of fusion data rejects the other anomalies and considers them false positives.

TABLE 1

| LOF model | Total Cost | Positive Cost | Negative Cost |
|---|---|---|---|
| lack of fusion | 1186 | 68 | 1118 |
| keyhole | 2105 | 108 | 1997 |
| gas porosity | 3604 | 141 | 3463 |
| tungsten | 24192 | 24 | 24169 |

Figure 12D:
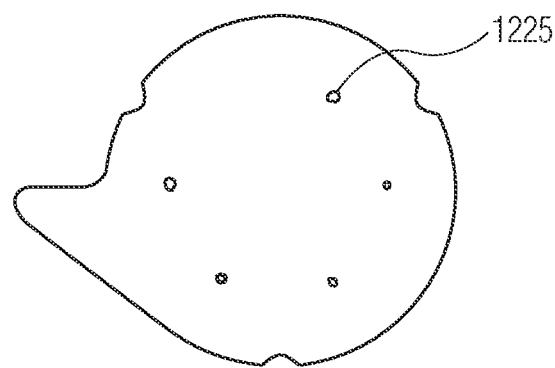
FIG. 12D shows the lack of fusion model prediction on a lack of fusion part, according to embodiments of the disclosure.
Figure 12E:
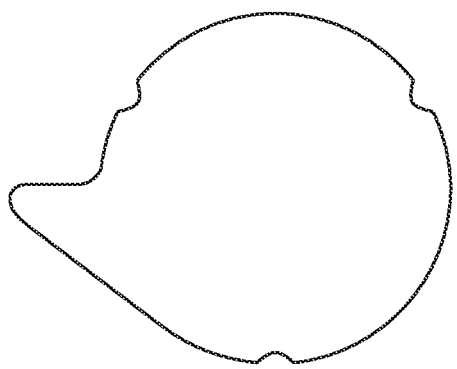
FIGS. 12E-12G show the lack of fusion model predictions on parts with keyhole, gas porosity and tungsten anomalies, respectively, according to embodiments of the disclosure.
Figure 12F:
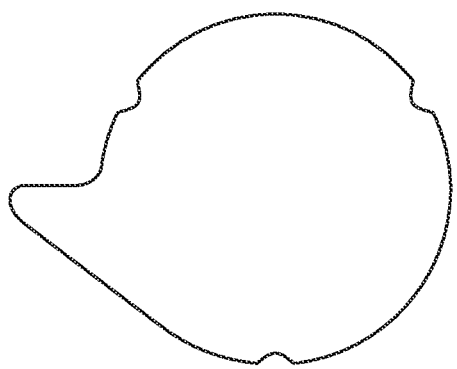
Figure 12G:
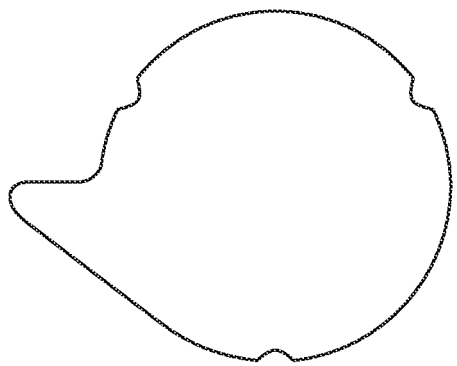

In some embodiments another way to evaluate an adversarially trained model is to visualize the predictions, which can be performed, for example, in the PrintRite3D® user interface. FIG. 12D shows the LOF model prediction on a lack of fusion part. Lack of fusion regions 1225 show up indicating that the model accurately predicts the lack of fusion anomaly. FIGS. 12E-12G show the LOF model predictions on the parts with keyhole, gas porosity and tungsten anomalies, respectively, with each prediction showing low probabilities of being lack of fusion anomalies.

Figure 12H:
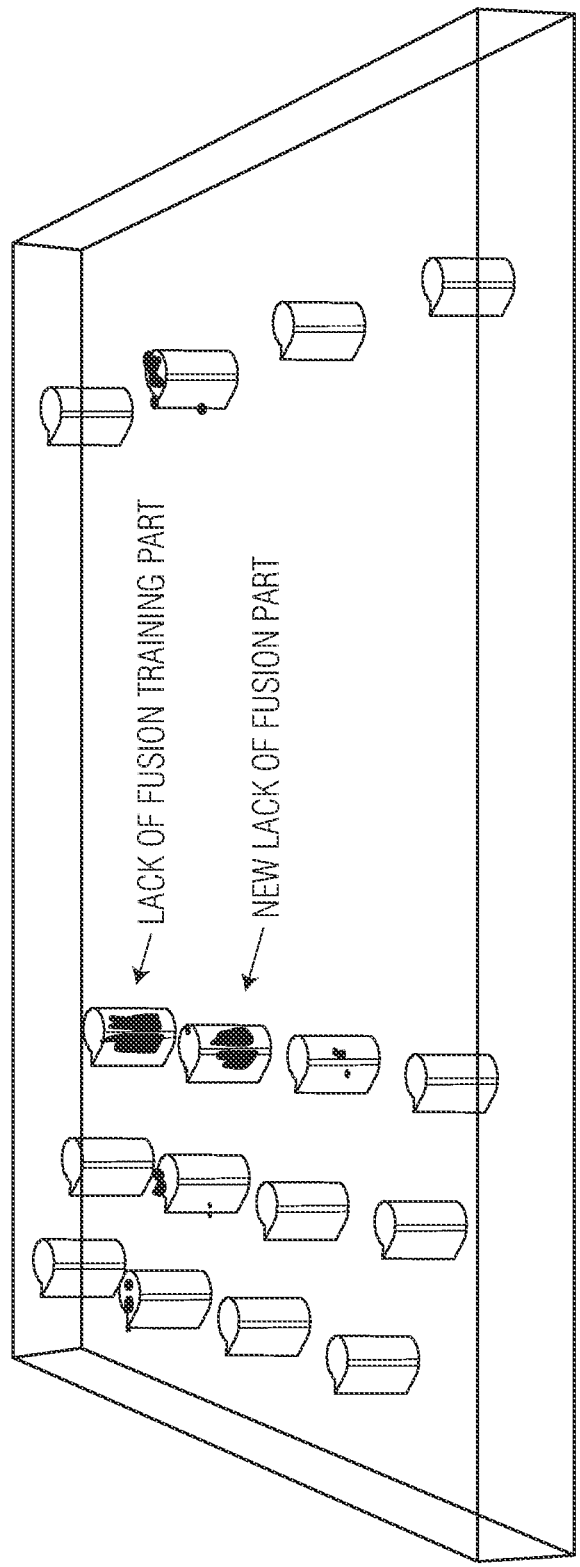
FIG. 12H shows the prediction on PrintRite3D® visualization generated by the lack of fusion model, according to embodiments of the disclosure.

FIG. 12H shows the prediction on PrintRite3D® visualization generated by the LOF model. From this 3D tool, it can be seen that the LOF model is able to recognize the anomalies from another part with lack of fusion anomalies and ignore most of the other anomaly types on the build plate.

Gas Porosity Model

Figure 13A:
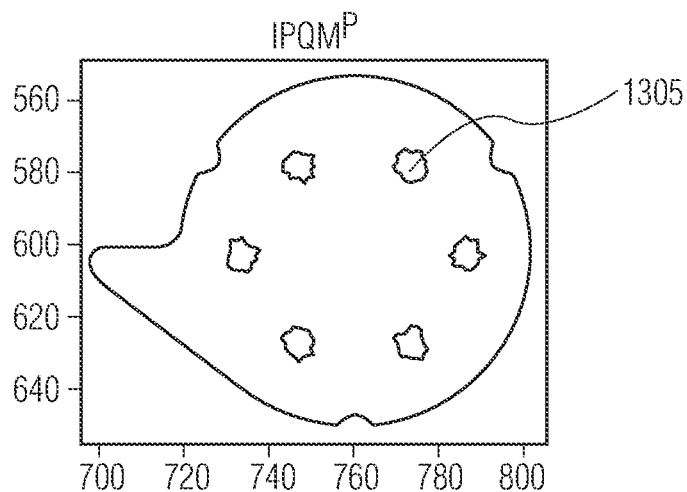
FIG. 13A shows the test layer visualization with respect to lack of fusion, according to embodiments of the disclosure.
Figure 13B:
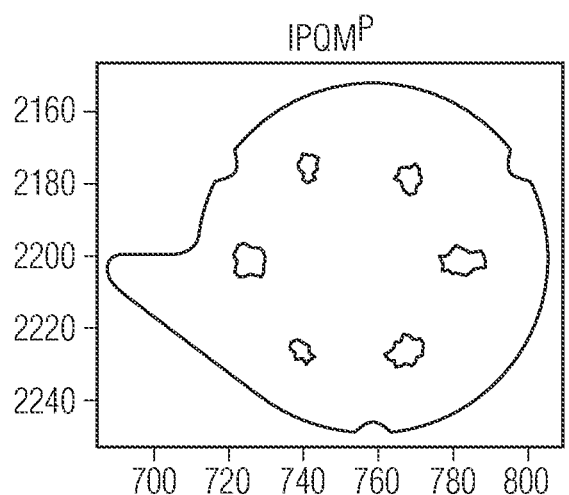
FIGS. 13B and 13C show the test layer visualization with respect to keyhole and tungsten inclusion, respectively, according to embodiments of the disclosure.
Figure 13C:
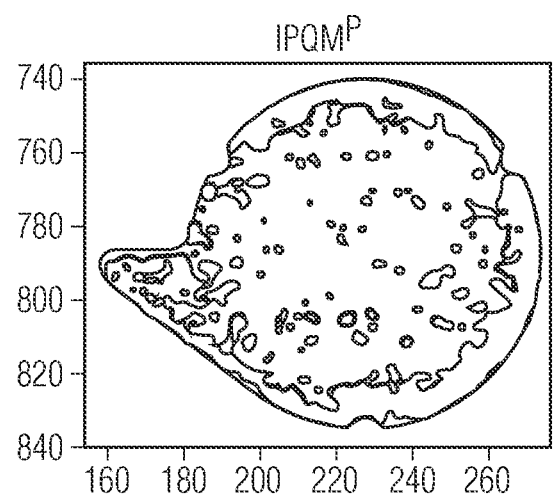

Table 2 shows the layer cost values of gas porosity (GP) model testing the parts with four anomaly types. FIG. 13A shows the test layer visualization with respect to lack of fusion 1305, while FIGS. 13B and 13C show the test layer visualization with respect to keyhole and tungsten inclusion, respectively. The low cost value on the same type (e.g., gas porosity in this case) and the high cost value on the other types imply that the model trained with the gas porosity data rejects the other anomalies and considers them false positives.

TABLE 2

| GP model | Total Cost | Positive Cost | Negative Cost |
|---|---|---|---|
| gas porosity | 1288 | 77 | 1211 |
| lack of fusion | 3694 | 70 | 3625 |
| keyhole | 2025 | 6 | 2019 |
| tungsten | 24343 | 0 | 24343 |

Figure 13D:
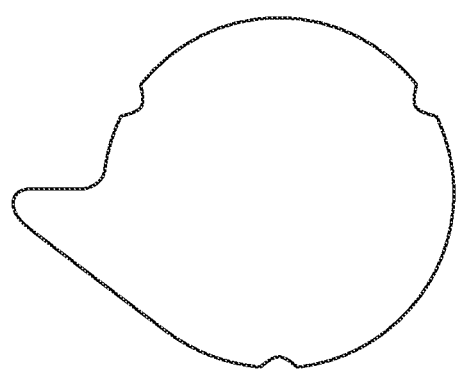
FIGS. 13D, 13E, 13F and 13G show the model predictions on parts with lack of fusion, gas porosity, keyhole, and tungsten inclusion anomalies, respectively, according to embodiments of the disclosure.
Figure 13E:
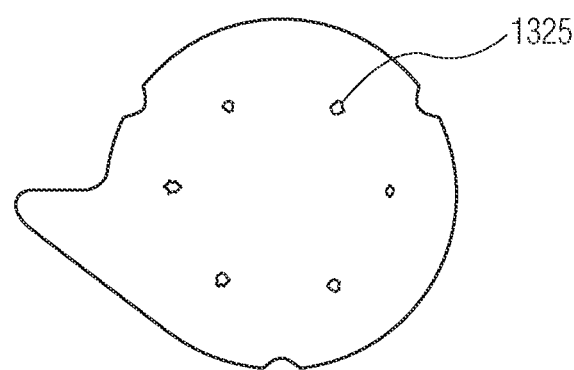
Figure 13F:
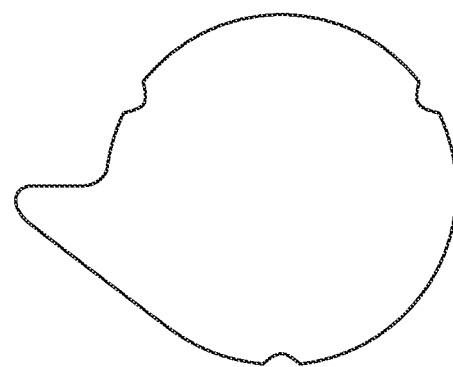
Figure 13G:
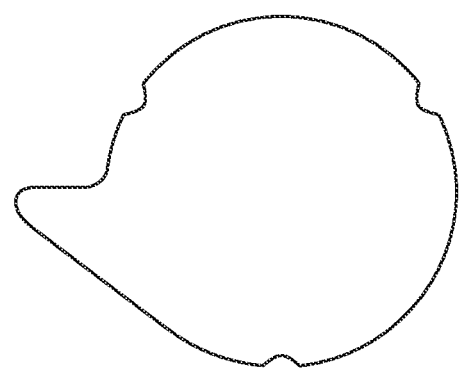

In some embodiments another way to evaluate an adversarially trained model is to visualize the predictions, which can be performed, for example, in the PrintRite3D® user interface. FIG. 13E shows the GP model prediction on a gas porosity part. Gas porosity regions 1325 show up indicating that the model accurately predicts the gas porosity anomaly. FIGS. 13D, 13F and 13G show the model predictions on the parts with lack of fusion, keyhole, and tungsten inclusion anomalies, respectively, with each prediction showing low probabilities of being gas porosity anomalies.

FIG. 13H shows the prediction on PrintRite3D® visualization generated by the GP model. The anomalies appeared only in the part that was used for training. The anomalies did not show up in the other parts of the same type, because the training part had been selected based on the strength of its metrics.

Keyhole Model

Figure 14A:
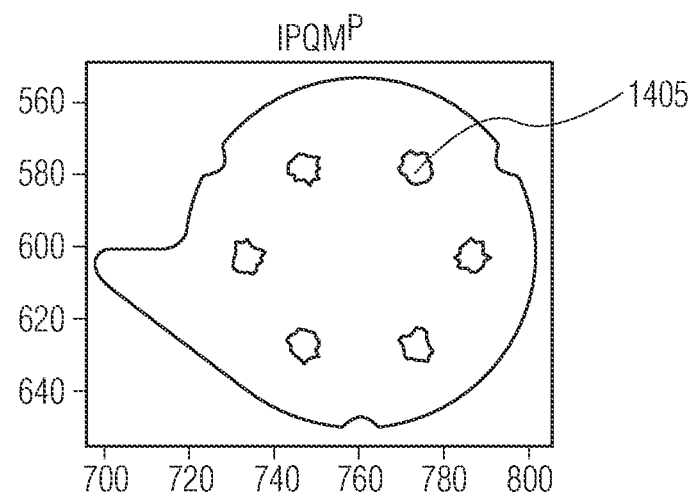
FIG. 14A shows the test layer visualization with respect to lack of fusion, according to embodiments of the disclosure.
Figure 14B:
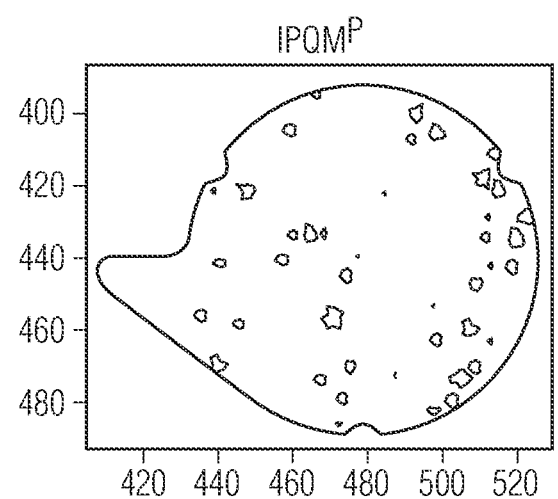
FIGS. 14B and 14C show the test layer visualization with respect to gas porosity, and tungsten anomalies, respectively, according to embodiments of the disclosure.
Figure 14C:
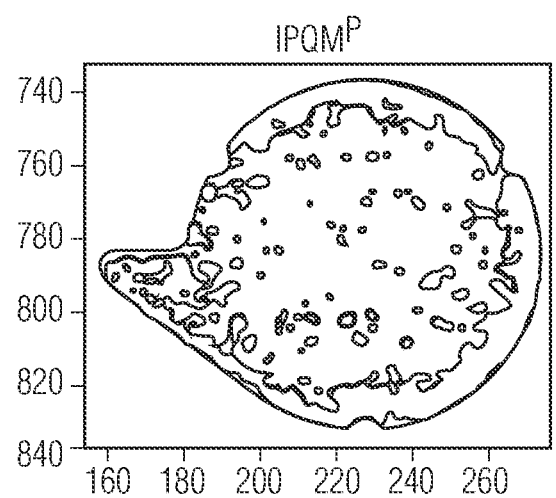

Table 3 shows the layer cost values of key hole (KH) model testing the parts with four anomaly types. FIG. 14A shows the test layer visualization with respect to lack of fusion 1405, while FIGS. 14B and 14C show the test layer visualization with respect to gas porosity, and tungsten anomalies, respectively. The low cost value on the same type and the high cost value on the other types imply that the model trained with the keyhole data rejects the other anomalies and considers them false positives.

TABLE 3

| KH model | Total Cost | Positive Cost | Negative Cost |
|---|---|---|---|
| keyhole | 885 | 122 | 762 |
| lack of fusion | 3677 | 79 | 3598 |
| gas porosity | 3544 | 54 | 3491 |
| tungsten | 24346 | 0 | 24346 |

Figure 14D:
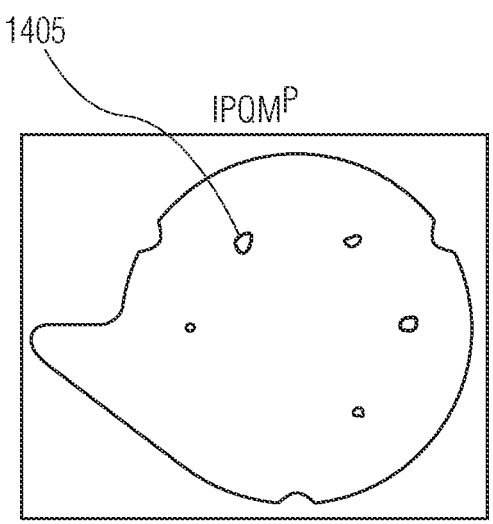
FIG. 14D shows the KH model prediction on a keyhole part, according to embodiments of the disclosure.
Figure 14E:
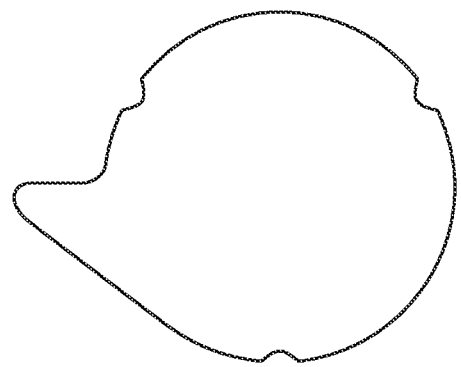
FIGS. 14E-14G show the model predictions on the parts with lack of fusion, gas porosity and tungsten anomalies, respectively, according to embodiments of the disclosure.
Figure 14F:
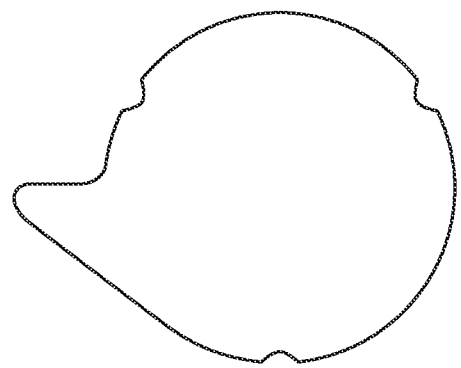
Figure 14G:
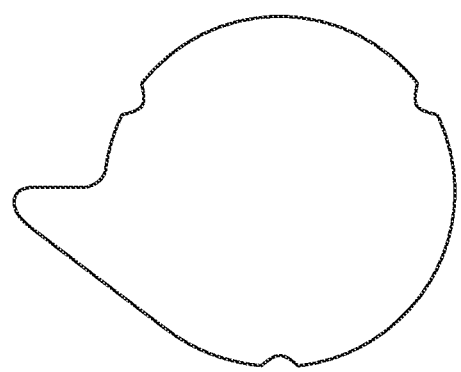

In some embodiments another way to evaluate an adversarially trained model is to visualize the predictions, which can be performed, for example, in the PrintRite3D® user interface. FIG. 14D shows the KH model prediction on a keyhole part. FIGS. 14E-14G show the model predictions on the parts with lack of fusion, gas porosity and tungsten anomalies, respectively. In the keyhole case (FIG. 14D), the keyhole anomalies 1405 show up with high probabilities, whereas the lack of fusion, gas porosity and tungsten anomalies, FIGS. 14E-14G, respectively, have low probabilities of being keyhole anomalies.

Figure 14H:
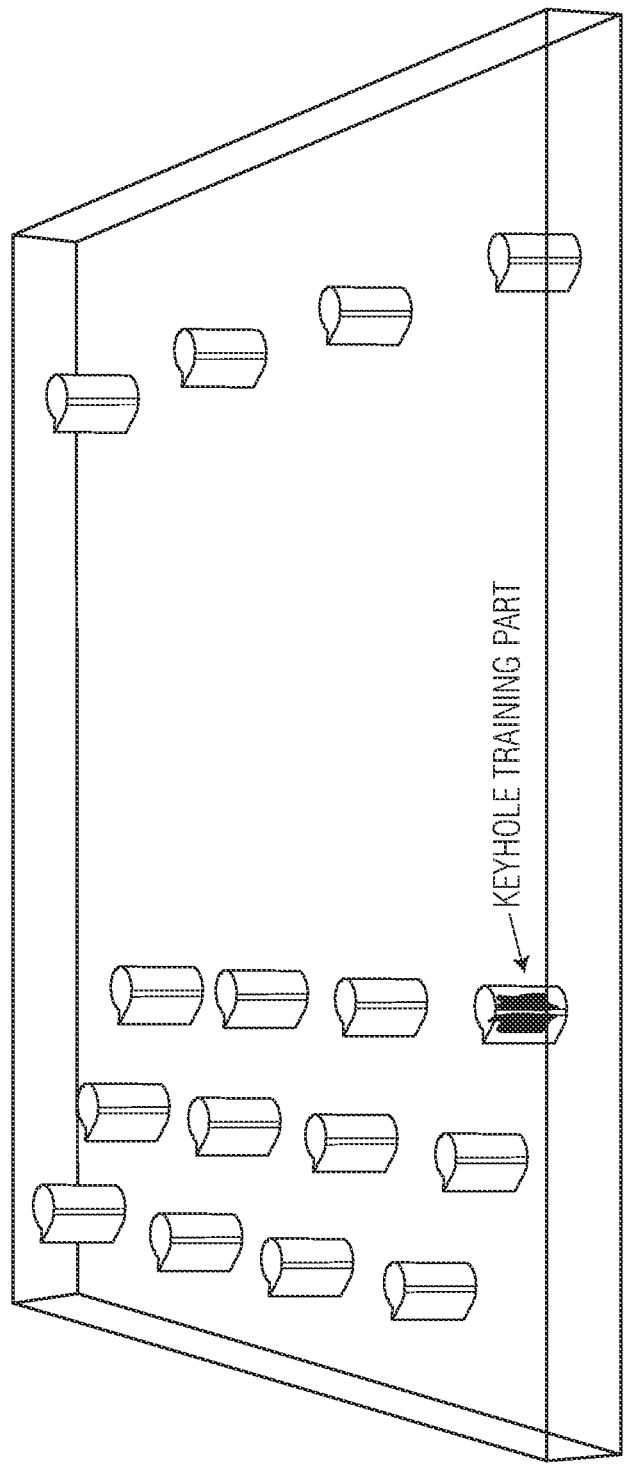
FIG. 14H shows the prediction on PrintRite3D® visualization generated by the KH model, according to embodiments of the disclosure.

FIG. 14H shows the prediction on PrintRite3D® visualization generated by the KH model. From this tool, it can be seen that the KH model is able to recognize only a few of the anomalies from another part with keyhole anomalies and ignore other anomaly types on the build plate.

Tungsten Model

Figure 15A:
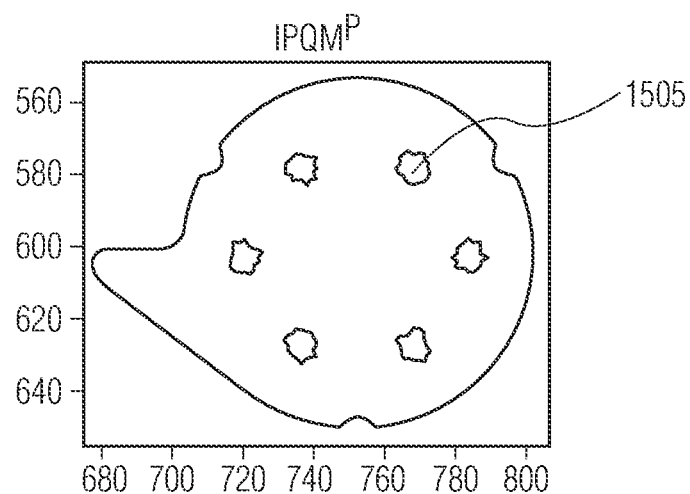
FIGS. 15A-15C show the test layer visualization with respect to lack of fusion, gas porosity, and keyhole anomalies, respectively, according to embodiments of the disclosure.
Figure 15B:
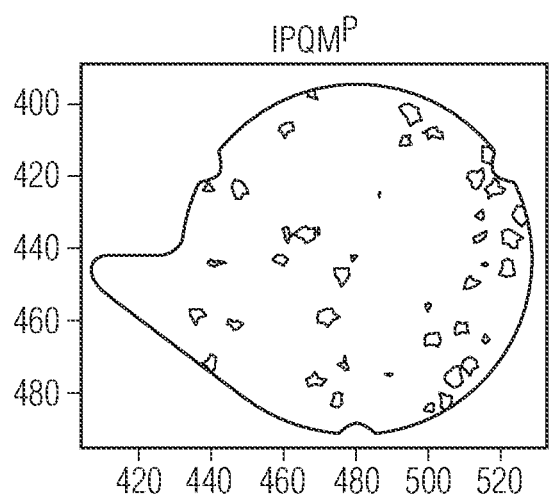
Figure 15C:
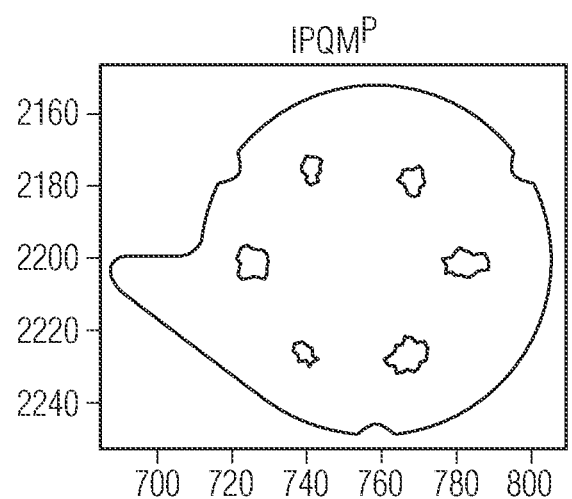

Table 4 shows the layer cost values of the tungsten inclusion model testing the parts with four anomaly types. FIGS. 15A-15C show the test layer visualization with respect to lack of fusion, gas porosity, and keyhole anomalies, respectively. The low cost value on the same type and the high cost value on the other types imply that the model trained with the inclusion data rejects the other anomalies and considers them false positives.

TABLE 4

| W model | Total Cost | Positive Cost | Negative Cost |
|---|---|---|---|
| tungsten | 7294 | 725 | 6569 |
| lack of fusion | 3640 | 3 | 3636 |

TABLE 4-continued

| W model | Total Cost | Positive Cost | Negative Cost |
|---|---|---|---|
| gas porosity | 3551 | 54 | 3498 |
| keyhole | 2019 | 1 | 2018 |

Figure 15D:
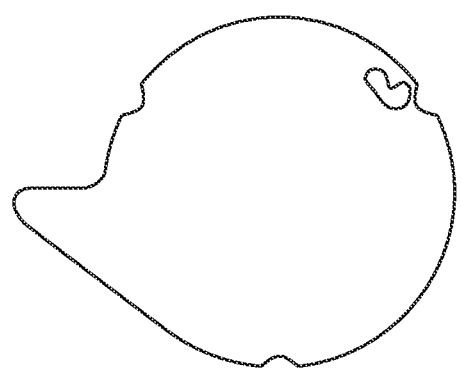
FIGS. 15D, 15E, 15F and 15G show the model predictions on the parts with lack of fusion, tungsten inclusion, gas porosity and keyhole anomalies, respectively, according to embodiments of the disclosure.
Figure 15E:
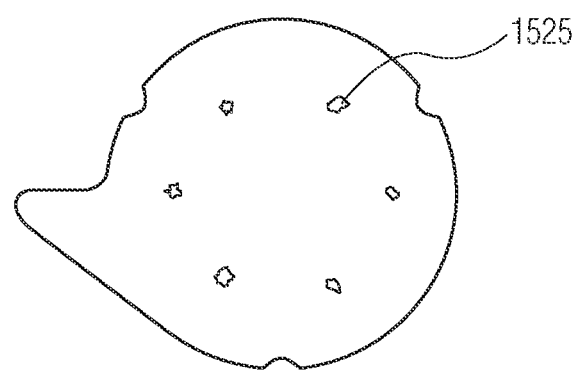
Figure 15F:
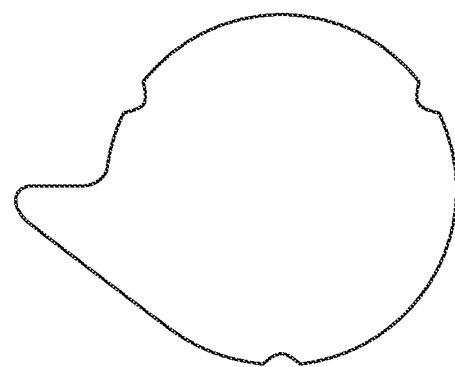
Figure 15G:
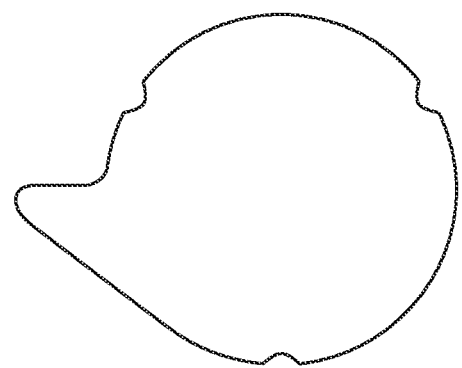

In some embodiments another way to evaluate an adversarially trained model is to visualize the predictions, which can be performed, for example, in the PrintRite3D® user interface. FIG. 15E shows the tungsten inclusion model prediction on a different tungsten inclusion part and the prediction colormap. FIGS. 15D, 15F and 15G show the model predictions on the parts with lack of fusion, gas porosity and keyhole anomalies, respectively. In the tungsten inclusion case (FIG. 15E), the tungsten inclusion anomalies 1525 show up with high probabilities. In contrast, the lack of fusion, gas porosity and keyhole anomalies have low probabilities of being tungsten inclusion anomalies.

Figure 15H:
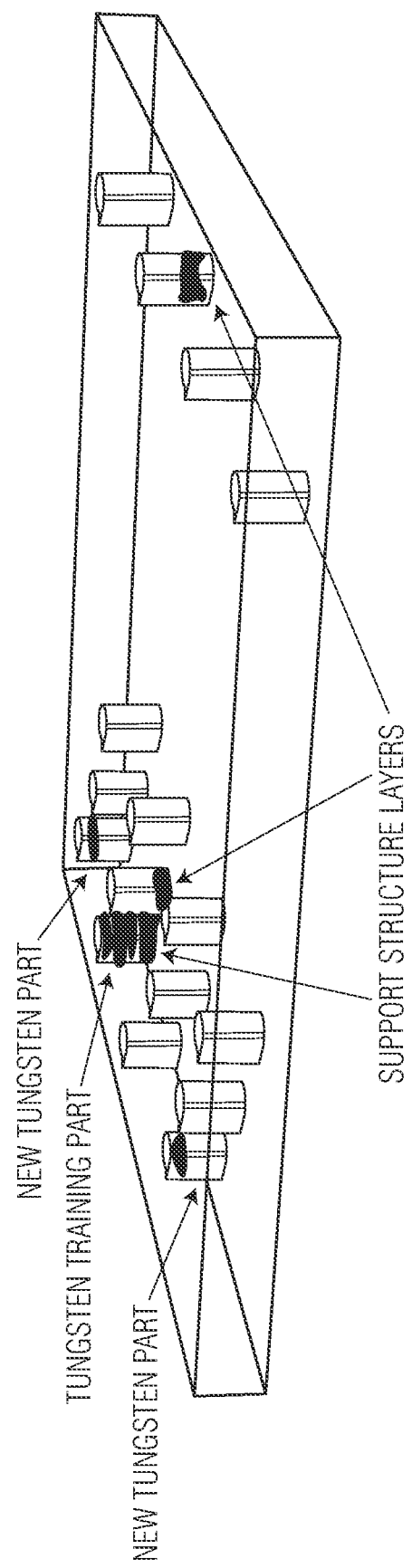
FIG. 15H shows the prediction on PrintRite3D® visualization generated by the tungsten inclusion model, according to embodiments of the disclosure.

FIG. 15H shows the prediction on PrintRite3D® visualization generated by the tungsten inclusion model. The anomalies appeared only in the part that was used for training in the layers where tungsten particles were applied. The anomalies showed up in some of the other parts of the same type, because the training part had been selected based on the strength of its metrics. The anomalies also showed up in the support structure of the trained tungsten part and a few other parts.

Conclusion

It has been demonstrated that machine learning models can be trained to recognize at least four different common types of anomalies: lack of fusion, gas porosity, keyhole, and tungsten inclusions. It will be appreciated by one of skill in the art having the benefit of this disclosure that other anomaly types can be detected and identified using a similar methodology. The models use PrintRite3D® metrics including TED, TED SIGMA, TEP and TEP SIGMA as features and the CT data as labels, however other embodiments can use other metrics. The predictions show a strong correlation with the CT labels. The models were trained both to agree with the labels for the anomaly type and to reject anomalies of the other three types. This resulted in improved discrimination in the predictions of each anomaly type.

The specific example embodiment described herein focused on producing $IPQM^P$ metrics for each anomaly type, however other embodiments can use different metrics. Prediction metrics like these can make it possible to close the loop on controlling the build process. More specifically, anomalies can be automatically repaired or brought to the attention of production managers who can decide whether or not to interrupt the build process.

In some embodiments, the machine learning models access the production process and classify the anomalous signals into the various types. Such an all-in-one model could be built on the techniques developed in the embodiment described herein, however in other embodiments other suitable machine learning techniques can be used.

Example Additive Manufacturing Apparatus

Figure 16:
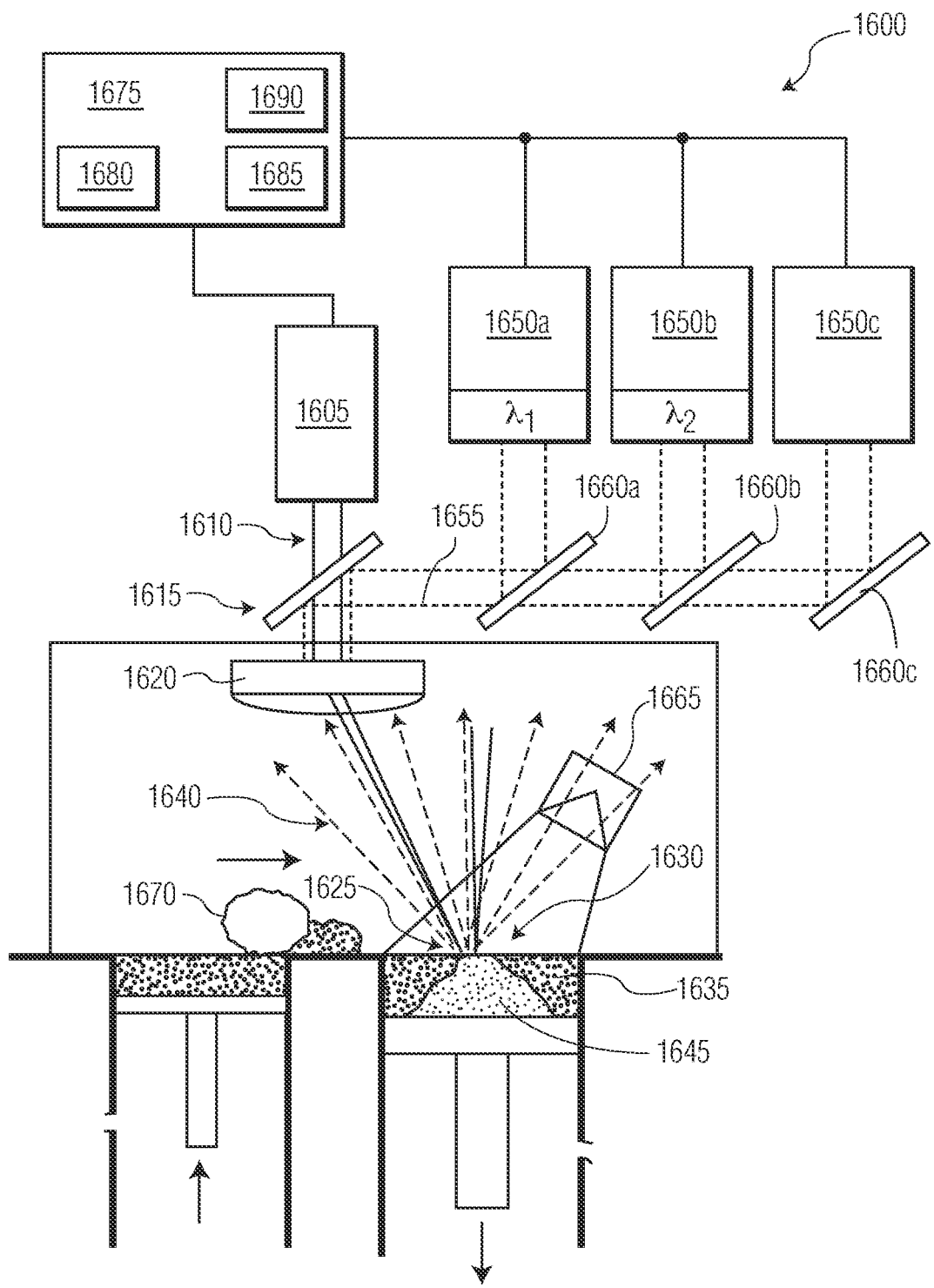
FIG. 16 shows an example additive manufacturing system, according to embodiments of the disclosure.

FIG. 16 shows an exemplary additive manufacturing system 1600. As shown in FIG. 16, additive manufacturing system 1600 includes a laser as an energy source 1605, however other embodiments may use an electron beam or other suitable energy source. Energy source 1605 emits a laser beam 1610 which passes through a partially reflective mirror 1615 and enters a scanning and focusing system 1620 which then projects the beam to a region 1625 on build plane 1630. In some embodiments, build plane 1630 is a powder bed of metallic powder 1635. Electromagnetic energy 1640 is emitted from region 1625 due to high material temperatures and emissivity properties of the materials receiving being irradiated by laser beam 1610. Laser beam 1610 fuses metallic powder 1635 into a part 1645 that is built layer by layer.

In some embodiments, the scanning and focusing system 1620 can be configured to collect some of the electromagnetic energy 1640 emitted from region 1625. In some embodiments, a melt pool and luminous plume can cooperatively emit blackbody radiation from within region 1625. The melt pool is the result of powdered metal 1635 liquefying due to the energy imparted by laser beam 1610 and is responsible for the emission of most of the electromagnetic energy 1640 being reflected back toward focusing system 1620. The luminous plume results from vaporization of portions of the powdered metal 1635. The partially reflective mirror 1615 can reflect most of the electromagnetic energy 1640 received by focusing system 1620. This reflected energy is indicated on FIG. 16 as optical energy 1655. Optical energy 1655 may be interrogated by on-axis optical sensors 1650. Each of the on-axis optical sensors 1650 receive a portion of optical energy 1655 through mirrors 1660a and 1660b. In some embodiments, mirrors 1660 can be configured to reflect only wavelengths $\lambda_1$ and $\lambda_2$, respectively. In some embodiments, optical sensors 1650 receive a total of 80-90% of the light reflected through the optics train.

Optical sensors 1650 can also include notch filters that are configured to block any light outside of respective wavelengths $\lambda_1$ and $\lambda_2$. Third optical sensor 1650c can be configured to receive light from partially reflective mirror 1660c. In some embodiments, optical sensors 1650a and 1650b can be covered by notch filters while third optical sensor 1650c can be configured to measure a much larger range of wavelengths. In some embodiments, optical sensor 1650a or 1650b can be replaced with a spectrometer configured to perform an initial characterization of a blackbody radiation curve associated with a batch of powder being used to perform an additive manufacturing process. This characterization can then be used to determine how the wavelength filters of optical sensors 1650a and 1650b are configured to be offset and avoid any spectral peaks associated with the black body curve characterized by the spectrometer. This characterization is performed prior to a full additive manufacturing operation being carried out.

In some embodiments third optical sensor 1650c is configured to measure thermal energy density. The thermal energy density is sensitive to changes in process parameters such as, for example, energy source power, energy source speed, and hatch spacing.

Examples of on-axis optical sensors 1650 include but are not limited to photo to electrical signal transducers (i.e. photodetectors) such as pyrometers and photodiodes. Optical sensors 1650 can also include spectrometers, and low or high speed cameras that operate in the visible, ultraviolet, or the infrared frequency spectrum. The on-axis optical sensors 1650 are in a frame of reference which moves with laser beam 1610, i.e., they see all regions that are touched by the laser beam and are able to collect electromagnetic energy 1640 from all regions of build plane 1630 touched as the laser beam 1610 scans across build plane 1630. Because the optical energy 1640 collected by the scanning and focusing system 1620 travels a path that is near parallel to the laser beam, sensors 1650 can be considered on-axis sensors.

In some embodiments, additive manufacturing system 1600 can include one or more off-axis sensors 1665 that are in a stationary frame of reference with respect to laser beam

1610. Additionally, there could be contact sensors on a recoater arm 1670 configured to spread metallic powder 1635 across build plane 1630. These sensors could be accelerometers, vibration sensors, etc. Lastly, there could be other types of sensors such as thermocouples to measure macro thermal fields or could include acoustic emission sensors which could detect cracking and other metallurgical phenomena occurring in part 1645 as it is being built.

In some embodiments, a computing system 1675, including one or more processors 1680, computer readable medium 1685, and an I/O interface 1690, is provided and coupled to suitable system components of the additive manufacturing system in order to collect data from the various sensors. Data received by computing system 1675 can include in-process raw sensor data and/or reduced order sensor data. One or more processors 1680 can use in-process raw sensor data and/or reduced order sensor data to determine laser 1610 power and control information, including coordinates in relation to build plane 1630. In other embodiments, computing system 1675, including one or more processors 1680, computer readable medium 1685, and an I/O interface 1690, can provide for control of the various system components. Computing system 1675 can send, receive, and monitor control information associated with laser 1605, build plane 1630, and other associated components and sensors.

One or more processors 1680 can be used to perform calculations using the data collected by the various sensors to generate in-process quality metrics (e.g., TED, TED Sigma, TEP, TEP Sigma). In some embodiments, data generated by on-axis optical sensors 1650 can be used to determine thermal energy density (TED) and/or TEP during the build process. Control information associated with movement of the energy source 1605 across the build plane 1630 can be received by one or more processors 1680. One or more processors 1680 can then use the control information to correlate data from on-axis optical sensor(s) 1650 and/or off-axis optical sensor(s) 1665 with a corresponding location. This correlated data can then be combined to calculate thermal energy density. In some embodiments, the thermal energy density and/or other metrics can be used by one or more processors 1680 to generate control signals for process parameters, for example, laser power, laser speed, hatch spacing, and other process parameters in response to the thermal energy density or other metrics. As described herein, one or more processors 1680 may use the one or more process parameters as inputs into one or more trained machine learning algorithms to detect and identify defects in part 1645 real-time. In this way, a problem that might otherwise ruin a production part can be ameliorated. In embodiments where multiple parts are being generated at once, prompt corrections to the process parameters in response to metrics falling outside desired ranges can prevent adjacent parts from receiving too much or too little energy from the energy source.

In some embodiments, I/O interface 1690 can be configured to transmit data collected to a remote location. I/O interface 1690 can be configured to receive data from a remote location. The data received can include baseline datasets, historical data, post-process inspection data, and classifier data. The remote computing system can calculate in-process quality metrics using the data transmitted by the additive manufacturing system. The remote computing system can transmit information to I/O interface 1690 in response to in-process quality metrics and/or detection of defects. It should be noted that the sensors described in conjunction with FIG. 16 can be used in the described ways to characterize performance of any additive manufacturing process involving sequential material build up.

While the embodiments described herein have used data generated by optical sensors to determine the thermal energy density, the embodiments described herein may be implemented using data generated by sensors that measure other manifestations of in-process physical variables. Sensors that measure manifestations of in-process physical variables include, for example, force and vibration sensors, contact thermal sensors, non-contact thermal sensors, ultrasonic sensors, and eddy current sensors. It will be apparent to one of ordinary skill in the art that many modifications and variations are possible in view of the above teachings.

In some embodiments TEP can include the steps of identifying spectral peaks associated with material properties of a batch of powder and selecting a first wavelength and a second wavelength spaced apart from the first wavelength, the first wavelength and the second wavelength being offset from the identified spectral peaks. A plurality of scans of an energy source can be generated across a layer of the batch of powder disposed upon a build plane during an additive manufacturing operation. An amount of energy radiated from the build plane can be measured at the first wavelength and an amount of energy radiated from the build plane can be measured at the second wavelength. Variations in temperature of an area of the build plane traversed by the plurality of scans can be determined based upon a ratio of energy radiated at the first wavelength to energy radiated at the second wavelength. In some embodiments it can be determined that the variations in temperature are outside a threshold range of values, and thereafter, adjusting subsequent scans of the energy source across or proximate the area of the build plane.

In various embodiments the additive manufacturing method above further comprises determining the area of the build plane traversed by: determining a start point of a first scan of the plurality of scans and determining an end point of the first scan. Further, a length of the first scan can be determined by calculating a distance between the start point and the end point.

In some embodiments the additive manufacturing method above further comprises: mapping a thermal energy density to locations within a part being formed by the additive manufacturing operation by receiving energy source drive signal data indicating a path of the energy source across the build plane, and determining a location of each of the plurality of scans using the energy source drive signal data.

In some embodiments TED includes an additive manufacturing method, comprising generating a plurality of scans of an energy source across a build plane and measuring an amount of energy radiated from the build plane during each of the plurality of scans using an optical sensor monitoring the build plane. An area of the build plane traversed during one or more scans of the plurality of scans of the energy source is determined. A thermal energy density for the area of the build plane traversed by the one or more scans of the plurality of scans is determined based upon the amount of energy radiated and the area of the build plane traversed by the plurality of scans. The thermal energy density is mapped to one or more locations of the build plane. In some embodiments it can be determined that the thermal energy density is characterized by a density outside a range of density values, and thereafter, adjusting subsequent scans of the energy source across or proximate the one or more locations of the build plane.

In some embodiments the additive manufacturing method described above further includes wherein determining that the thermal energy density is characterized by a density outside a range of density values further comprises, receiving a baseline and determining one of more thermal energy density scan values are substantially different than the baseline. At least one of a graph and a point cloud can be generated as an output.

Figure 17:
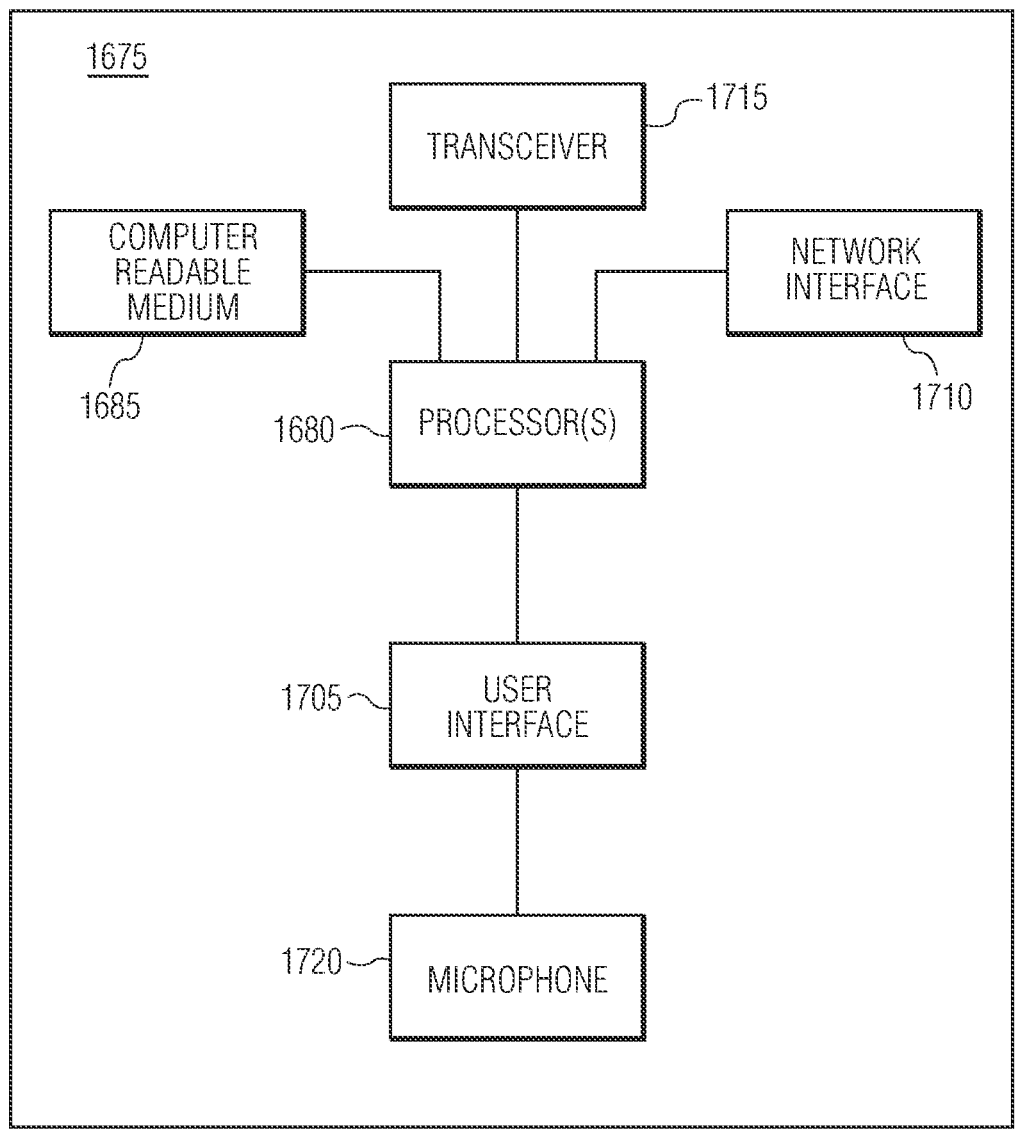
FIG. 17 shows an expanded block diagram of the example computing system shown in FIG. 16.

FIG. 17 shows an expanded block diagram of an example computing system 1675. In some embodiments, example computing system can implement any or all of the functions, behaviors, and capabilities described herein as being performed by a computing system or processor, as well as other functions, behaviors, and capabilities not expressly described. Computing system 1675 can include one or more processors 1680, computer readable medium 1685, user interface 1705 and network interface 1710. Computing system 1675 can also include other components (not explicitly shown) such as a battery, power controllers, and other components operable to provide various enhanced capabilities. In various embodiments, computing system 1675 can be implemented in a desktop computer, laptop computer, tablet computer, smart phone, other mobile phone, wearable computing device, or other systems having any desired form factor. Further, as noted above, computing system 1675 can be implemented partly in a base station and partly in a mobile unit that communicates with the base station and provides a user interface.

Computer readable medium 1685 can be implemented, e.g., using disk, flash memory, or any other non-transitory storage medium, or a combination of media, and can include volatile and/or non-volatile media. In some embodiments, computer readable medium 1685 can store one or more application and/or operating system programs to be executed by one or more processors 1680, including programs to implement various operations described above as being performed by a host. For example, computer readable medium 1685 can store a uniform host application that can read a peripheral device description record and generate a graphical user interface for controlling the peripheral device based on information therein. Computer readable medium 1685 can also store program code executable to communicate with a transceiver 1715. Although FIG. 17 illustrates transceiver 1715 as a subsystem of computing system 1675 it is understood that transceiver 1715 may be a dongle that is plugged into and electrically coupled with computing system 1675 for example to enable machine learning algorithms or in-process parameters (e.g., TEP, TEP Sigma, TED or TED Sigma) to be executed. In some embodiments, portions (or all) of the host functionality described herein can be implemented in operating system programs rather than applications. In some embodiments, computer readable medium 1685 can also store apps designed for specific accessories or specific categories of accessories (e.g., an IP camera app to manage an IP camera peripheral device or a security app to interact with door lock accessories).

User interface 1705 can include input devices such as a touch pad, touch screen, scroll wheel, click wheel, dial, button, switch, keypad, microphone 1720, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1705 to invoke the functionality of computing system 1675.

One or more processors 1680 can be implemented as one or more integrated circuits, e.g., one or more single-core or multi-core microprocessors or microcontrollers, examples of which are known in the art. In operation, one or more processors 1680 can control the operation of computing system 1685 and/or additive manufacturing system 1600 (see FIG. 16). In various embodiments, one or more processors 1680 can execute a variety of programs in response to program code and can maintain multiple concurrently executing programs or processes. At any given time, some or all of the program code to be executed can be resident in one or more processors 1680 and/or in storage media such as computer readable medium 1685.

Further, while a computing system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Computing systems and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of computing system 1675 can perform all operations described above as being performed by a media access device and that an implementation of a peripheral device can perform any or all operations described above as being performed by a peripheral device. A proxy, bridge, tunnel, or coordinator can combine components of computing system 1675 and a peripheral device, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An additive manufacturing system comprising:
   a recoater arm arranged to distribute layer of metallic powder across a build plane;
   a power source arranged to emit a beam of energy at the build plane and fuse the metallic powder into a portion of a part; and
   a processor configured to:
   access a part geometry for the part;
   steer the beam of energy across the build plane based on the part geometry;
   receive data generated by one or more sensors that detect electromagnetic energy emitted from the build plane when the beam of energy fuses the metallic powder;
   convert the received data into one or more parameters that indicate one or more conditions at the build plane while the beam of energy fuses the metallic powder;
   select a machine learning algorithm based on at least in part on the part geometry;
   use the one or more parameters as input into the machine learning algorithm to generate an output from the machine learning algorithm; and
   use the output of the machine learning algorithm to detect one or more defects in the fused metallic powder.

2. The additive manufacturing system of claim 1 wherein the machine learning algorithm is further configured to determine a type of the one or more defects.

3. The additive manufacturing system of claim 2 wherein the type of the one or more defects includes at least one of a lack of fusion defect, a porosity defect or an inclusion defect.

4. The additive manufacturing system of claim 1 wherein the one or more parameters includes determining a thermal emission density (TED) that includes measuring an amount of energy radiated from the build plane during one or more scans and determining area of the build plane traversed during the one or more scans.

5. The additive manufacturing system of claim 1 wherein the one or more parameters includes identifying spectral peaks associated with material properties of a batch of powder and selecting a first wavelength and a second wavelength spaced apart from the first wavelength, and determining an amount of energy radiated from the build plane based upon a ratio of energy radiated at the first wavelength to energy radiated at the second wavelength.

6. The additive manufacturing system of claim 1 wherein the machine learning algorithm includes one or more training parameters based on a known-defective part.

7. The additive manufacturing system of claim 6 wherein the one or more training parameters are derived from a known-defective part having at least one void.

8. The additive manufacturing system of claim 6 wherein the one or more training parameters are derived from a known-defective part having at least one inclusion.

9. The additive manufacturing system of claim 1 wherein the one or more sensors includes an on-axis photodetector.

10. The additive manufacturing system of claim 1 wherein the detecting one or more defects further comprises a processor configured to determine whether the defect can be remedied.

11. The additive manufacturing system of claim 1 wherein the part geometry is received as a stereolithography (STL) file.

* * * * *